(12) United States Patent
Takagi et al.

(10) Patent No.: US 10,961,751 B2
(45) Date of Patent: Mar. 30, 2021

(54) VEHICLE DOOR LOCK APPARATUS

(71) Applicant: ANSEI CORPORATION, Obu (JP)

(72) Inventors: Masaharu Takagi, Nagoya (JP); Satoshi Yamaji, Nagoya (JP)

(73) Assignee: ANSEI CORPORATION, Obu (JP)

( * ) Notice: Subject to any disclaimer, the term of this patent is extended or adjusted under 35 U.S.C. 154(b) by 547 days.

(21) Appl. No.: 15/653,645

(22) Filed: Jul. 19, 2017

(65) Prior Publication Data
US 2018/0023327 A1 Jan. 25, 2018

(30) Foreign Application Priority Data

Jul. 20, 2016 (JP) .............................. JP2016-142211

(51) Int. Cl.
| | |
|---|---|
| *E05B 85/02* | (2014.01) |
| *E05B 83/36* | (2014.01) |
| *E05B 77/44* | (2014.01) |
| *E05B 79/12* | (2014.01) |
| *E05B 79/22* | (2014.01) |

(Continued)

(52) U.S. Cl.
CPC .............. *E05B 83/36* (2013.01); *E05B 77/44* (2013.01); *E05B 79/12* (2013.01); *E05B 79/22* (2013.01); *E05B 85/02* (2013.01); *B60J 5/00* (2013.01); *E05B 77/06* (2013.01); *E05B 81/06* (2013.01);
(Continued)

(58) Field of Classification Search
CPC ................................................ Y10T 292/1047
See application file for complete search history.

(56) References Cited

U.S. PATENT DOCUMENTS 2,634,147 A * 4/1953 Robertson ............. E05B 85/045
  292/216
2,806,727 A * 9/1957 Johnstone ............... E05B 83/16
  292/216

(Continued)

FOREIGN PATENT DOCUMENTS

| CN | 1174882 C | 11/2004 |
|---|---|---|
| CN | 1729341 A | 2/2006 |

(Continued)

OTHER PUBLICATIONS

Unpublished U.S. Appl. No. 16/296,717.

(Continued)

*Primary Examiner* — Carlos Lugo
(74) *Attorney, Agent, or Firm* — J-Tek Law PLLC; Jeffrey D. Tekanic; Scott T. Wakeman

(57) ABSTRACT

A vehicle door lock apparatus includes a housing, a fork, a pawl, a first lever displaceably provided in the housing such that the first lever can act on the pawl, and a second lever pivotably provided in the housing. One end of the second lever has a linkage coupled to a lower end of a transmission rod, which is coupled to an exterior door handle. The second lever pivots in response to an opening operation being performed on the exterior door handle and acts on the first lever. A plane of rotation contains an arcuate trajectory traced by the linkage when it pivots in response to the opening operation being performed, and is located farther in a frontward direction of a vehicle frame than a fixing surface. The plane of rotation is inclined relative to a plane containing the fixing surface, and intersects this plane in the vehicle downward direction.

20 Claims, 13 Drawing Sheets

(51) Int. Cl.
  *E05B 85/00* (2014.01)
  *E05B 81/16* (2014.01)
  *E05B 77/06* (2014.01)
  *E05B 81/06* (2014.01)
  *B60J 5/00* (2006.01)

(52) U.S. Cl.
  CPC .............. *E05B 81/16* (2013.01); *E05B 85/00* (2013.01); *Y10T 292/1047* (2015.04)

(56) References Cited

U.S. PATENT DOCUMENTS

| | | | |
|---|---|---|---|
| 2,934,930 A | | 5/1960 | Garvey |
| 2,977,785 A | * | 4/1961 | Beckman ................ E05B 83/16 70/141 |
| 2,996,327 A | * | 8/1961 | France .................... E05B 83/16 292/340 |
| 3,334,934 A | * | 8/1967 | Sandor .................... E05B 85/243 292/216 |
| 3,359,767 A | | 12/1967 | Alfonsas et al. |
| 3,400,962 A | * | 9/1968 | Martens ................. E05B 79/20 292/216 |
| 3,596,482 A | * | 8/1971 | Pollak .................... E05B 83/36 70/151 R |
| 3,848,909 A | * | 11/1974 | Foley ..................... E05B 79/12 292/216 |
| 4,382,622 A | * | 5/1983 | Ishikawa ................ E05B 77/12 292/216 |
| 4,440,006 A | * | 4/1984 | Kleefeldt ............... E05B 77/48 292/DIG. 23 |
| 4,783,102 A | * | 11/1988 | Bernard .................. E05B 85/26 292/216 |
| 4,948,184 A | * | 8/1990 | Weyerstall ............. E05B 83/36 292/201 |
| 5,603,539 A | * | 2/1997 | Gruhn .................... E05B 85/243 292/199 |
| 5,733,046 A | | 3/1998 | Bellmore et al. |
| 5,802,894 A | | 9/1998 | Jahrsetz et al. |
| 6,264,253 B1 | | 7/2001 | Takaishi |
| 6,416,088 B1 | | 7/2002 | Graute |
| 6,419,286 B1 | | 7/2002 | Szablewski |
| 6,601,885 B1 | | 8/2003 | Yiu |
| 7,478,846 B2 | | 1/2009 | Yoshikuwa et al. |
| 7,568,741 B2 | | 8/2009 | Odahara |
| 7,621,571 B2 | * | 11/2009 | Umino ................... E05B 81/06 292/216 |
| 7,762,594 B2 | * | 7/2010 | Arabia, Jr. ............. E05B 81/20 292/201 |
| 7,827,836 B2 | | 11/2010 | Cetnar |
| 8,240,723 B2 | | 8/2012 | Akahori et al. |
| 8,376,417 B2 | | 2/2013 | Machida et al. |
| 8,438,888 B2 | | 5/2013 | Akizuki et al. |
| 8,662,545 B2 | * | 3/2014 | Taga ....................... E05B 85/02 292/201 |
| 8,678,452 B2 | * | 3/2014 | Nagaoka ................ E05B 77/265 292/201 |
| 8,726,705 B2 | | 5/2014 | Tabe et al. |
| 8,789,861 B2 | | 7/2014 | Takayanagi et al. |
| 8,814,228 B2 | * | 8/2014 | Fujiwara ................ B60J 5/0433 292/216 |
| 8,827,328 B2 | * | 9/2014 | Akizuki .................. E05B 81/06 292/201 |
| 9,631,404 B2 | | 4/2017 | Takagi et al. |
| 9,708,837 B2 | * | 7/2017 | Bendel ................... E05B 77/34 |
| 10,047,548 B2 | | 8/2018 | Zeabari |
| 10,094,149 B2 | * | 10/2018 | Mittelbach ............. E05B 77/34 |
| 10,273,724 B2 | * | 4/2019 | Yamagata ............... E05B 85/02 |
| 2001/0015558 A1 | | 8/2001 | Fisher et al. |
| 2003/0107235 A1 | | 6/2003 | Komatsu et al. |
| 2003/0218340 A1 | | 11/2003 | Coleman et al. |
| 2004/0178659 A1 | | 9/2004 | Komatsu et al. |
| 2004/0227357 A1 | | 11/2004 | Ishihara et al. |
| 2004/0251712 A1 | | 12/2004 | Obara |
| 2005/0140149 A1 | | 6/2005 | Umino |
| 2005/0218661 A1 | | 10/2005 | Brose et al. |
| 2006/0006671 A1 | | 1/2006 | Noel et al. |
| 2006/0028029 A1 | | 2/2006 | Spurr |
| 2006/0087129 A1 | | 4/2006 | Gotou et al. |
| 2006/0157989 A1 | | 7/2006 | Graute |
| 2006/0214467 A1 | | 9/2006 | Usuzaki et al. |
| 2008/0078215 A1 | | 4/2008 | Odahara |
| 2008/0203737 A1 | | 8/2008 | Tomaszewski et al. |
| 2010/0084888 A1 | | 4/2010 | Ishitobi et al. |
| 2010/0109350 A1 | | 5/2010 | Gschweng et al. |
| 2010/0194120 A1 | | 8/2010 | Kaiser et al. |
| 2010/0207401 A1 | | 8/2010 | Taga |
| 2010/0327609 A1 | | 12/2010 | Akizuki et al. |
| 2011/0179835 A1 | | 7/2011 | Tabe et al. |
| 2012/0000258 A1 | | 1/2012 | Akizuki et al. |
| 2012/0056437 A1 | | 3/2012 | Takayanagi et al. |
| 2012/0068479 A1 | | 3/2012 | Bendel et al. |
| 2012/0118029 A1 | | 5/2012 | Akizuki et al. |
| 2013/0015673 A1 | | 1/2013 | Akizuki et al. |
| 2013/0049379 A1 | | 2/2013 | Yokota et al. |
| 2013/0328325 A1 | | 12/2013 | Uehara et al. |
| 2014/0346786 A1 | | 11/2014 | Takagi et al. |
| 2014/0361555 A1 | | 12/2014 | Bendel et al. |
| 2015/0048632 A1 | | 2/2015 | Menke |
| 2015/0191945 A1 | | 7/2015 | Yamaguchi et al. |
| 2015/0259952 A1 | | 9/2015 | Barmscheidt |
| 2015/0267441 A1 | | 9/2015 | Fuchs et al. |
| 2015/0361694 A1 | | 12/2015 | Zeabari |
| 2016/0017645 A1 | | 1/2016 | Tomaszewski et al. |
| 2016/0115718 A1 | | 4/2016 | Lee et al. |
| 2016/0177599 A1 | | 6/2016 | Nozawa et al. |
| 2016/0273248 A1 | | 9/2016 | Mittelbach |
| 2016/0281395 A1 | | 9/2016 | Scholz et al. |
| 2017/0234039 A1 | | 8/2017 | Taga |
| 2018/0016820 A1 | | 1/2018 | Takagi et al. |
| 2018/0023325 A1 | | 1/2018 | Takagi et al. |
| 2018/0073282 A1 | | 3/2018 | Takagi et al. |
| 2018/0080262 A1 | | 3/2018 | Takagi et al. |
| 2018/0148956 A1 | | 5/2018 | Takagi et al. |

FOREIGN PATENT DOCUMENTS

| | | |
|---|---|---|
| CN | 101748944 A | 6/2010 |
| CN | 101812947 A | 8/2010 |
| CN | 101812948 A | 8/2010 |
| CN | 102362041 A | 2/2012 |
| CN | 101641231 B | 11/2012 |
| CN | 102822434 A | 12/2012 |
| CN | 103195310 A | 7/2013 |
| CN | 203239056 U | 10/2013 |
| CN | 103403283 A | 11/2013 |
| CN | 203294205 U | 11/2013 |
| CN | 103597155 A | 2/2014 |
| CN | 104114792 A | 10/2014 |
| CN | 203961528 U | 11/2014 |
| CN | 105525808 A | 4/2016 |
| CN | 105545126 A | 5/2016 |
| CN | 105593445 A | 5/2016 |
| DE | 102008015627 A1 | 10/2009 |
| EP | 0894923 A1 | 2/1999 |
| EP | 2881529 A1 | 6/2015 |
| EP | 2754799 B1 | 3/2017 |
| GB | 2396656 A | 6/2004 |
| GB | 2477612 A | 8/2011 |
| JP | S5944477 | 3/1984 |
| JP | S61163866 U | 10/1986 |
| JP | H0617960 Y2 | 5/1994 |
| JP | 2002129806 A | 5/2002 |
| JP | 2004156330 A | 6/2004 |
| JP | 2005188130 A | 7/2005 |
| JP | 2008088708 A | 4/2008 |
| JP | 4163490 B2 | 10/2008 |
| JP | 2011026826 A | 2/2011 |
| JP | 2011153431 A | 8/2011 |
| JP | 2011226194 A | 11/2011 |
| JP | 5030908 B2 | 9/2012 |
| JP | 2012180702 A | 9/2012 |
| JP | 2013096144 A | 5/2013 |
| JP | 2013117115 A | 6/2013 |

(56) References Cited

FOREIGN PATENT DOCUMENTS

| | | |
|---|---|---|
| JP | 2014015717 A | 1/2014 |
| JP | 2014029094 A | 2/2014 |
| JP | 2014043769 A | 3/2014 |
| JP | 2015096683 A | 5/2015 |
| JP | 2015209641 A | 11/2015 |
| JP | 2016056550 A | 4/2016 |
| JP | 2016098589 A | 5/2016 |
| JP | 5930273 B2 | 6/2016 |
| JP | 2018012940 A | 1/2018 |
| JP | 2018031256 A | 3/2018 |
| KR | 100694448 B1 | 3/2007 |
| TW | 593005 B | 6/2004 |

OTHER PUBLICATIONS

Office Action from the Japanese Patent Office dated Nov. 5, 2019 in related Japanese application No. 2016-140590, and machine translation thereof.

Office Action from the Japanese Patent Office dated Nov. 5, 2019 in related Japanese application No. 2016-183897, and machine translation thereof.

Machine translation of Search Report from the Japanese Patent Office dated Feb. 18, 2020 in related Japanese application No. 2016-223076.

Office Action from the Japanese Patent Office dated Feb. 25, 2020 in related Japanese application No. 2016-223076, and machine translation thereof.

Office Action and Search Report from the Chinese Patent Office dated Jun. 29, 2020 in related Chinese application No. 201710578652.7, and machine translation thereof.

Office Action and Search Report from the Taiwanese Patent Office dated Aug. 24, 2020 in related Taiwanese application No. 106131946, and translations thereof.

Search Report by Registered Search Organization of the Japanese Patent Office dated Oct. 30, 2020 in related Japanese application No. 2016-142211, and machine translation thereof.

\* cited by examiner

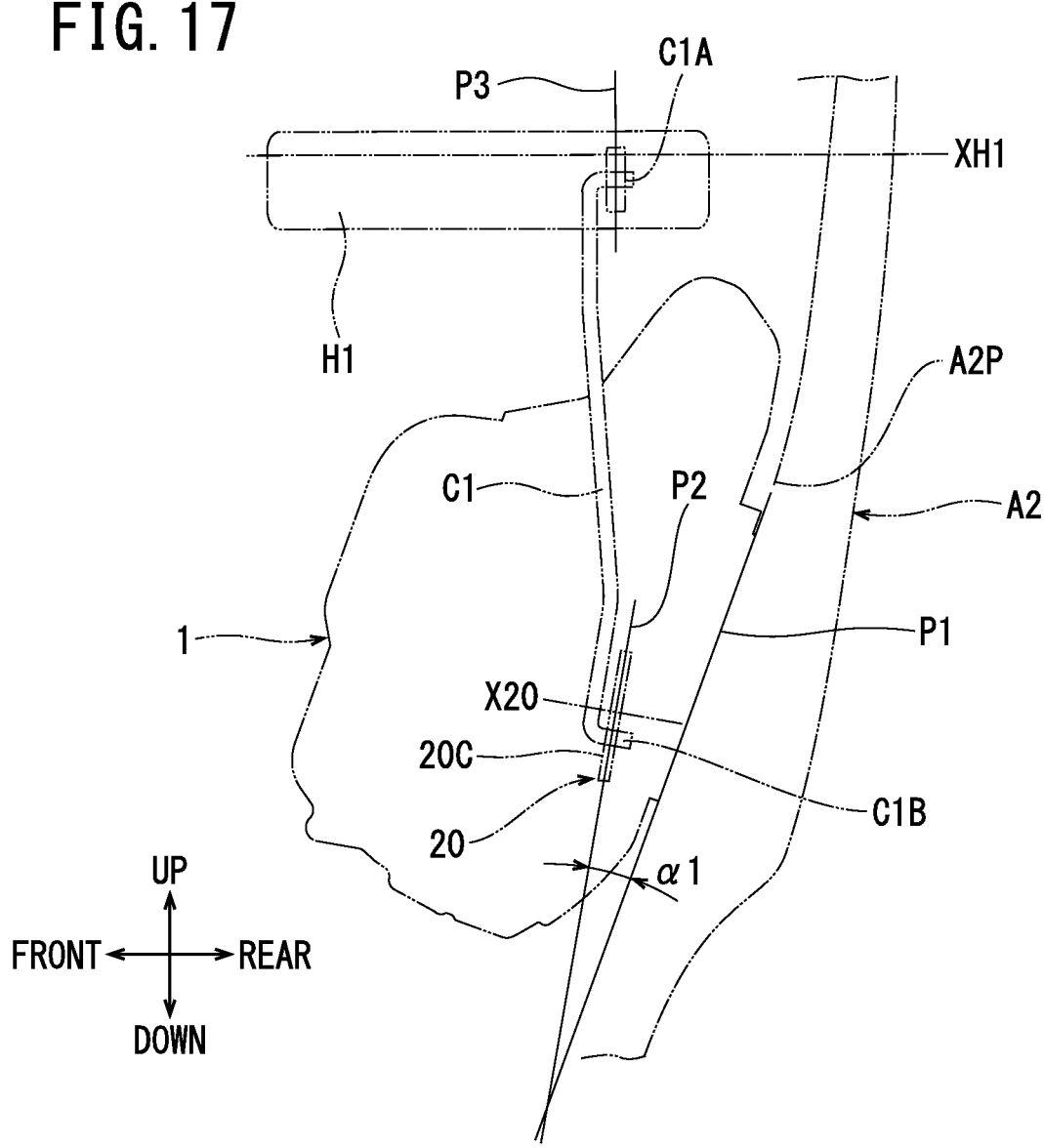

VEHICLE DOOR LOCK APPARATUS

CROSS-REFERENCE

This application claims the priority benefit of Japanese Patent Application No. 2016-142211 filed on Jul. 20, 2016, the entire contents of which are incorporated by reference as if fully set forth herein.

TECHNICAL FIELD

The present invention relates to a vehicle door lock apparatus.

BACKGROUND ART

Japanese Patent Laid-Open No. 2002-129806 (Patent Literature 1) discloses a known vehicle door lock apparatus that includes a housing, a fork, a pawl, a first lever, and a second lever. More specifically, the first lever is an open link and the second lever is an open lever.

The housing includes a base plate. The base plate is fixed such that a fixing surface thereof contacts a door that is openable and closable with respect to a vehicle frame, to which a striker is affixed. An entry opening, into which the striker can enter, is formed in the base plate.

As illustrated, e.g., in FIG. 4 of JP 2002-129806, the fork is pivotably provided on the base plate. The fork is displaceable to a latched position, where the fork retains the striker in the entry opening, and to an unlatched position, where the fork allows the striker to separate from the entry opening. The pawl is pivotably provided on the base plate. The pawl fixes or releases the fork. A lift lever is affixed to the pawl so as to integrally rotate therewith. As illustrated in FIG. 4 of JP 2002-129806, the pawl is supported so as to be pivotable about a pawl axis that is substantially orthogonal to the fixing surface of the base plate.

The first lever is displaceably provided in the housing. The first lever can be displaced upward to come into contact with the lift lever and thereby act on the pawl and is capable of causing the pawl to release the fork. The second lever is pivotably provided in the housing. One end of the second lever is coupled to an exterior door handle via a transmission rod. The other end of the second lever is coupled to the first lever. As illustrated, e.g., in FIGS. 2 and 5, of JP 2002-129806, the second lever pivots in response to an opening operation being performed on the exterior door handle to act on the first lever and is capable of displacing the first lever upward.

As illustrated in FIG. 2 of JP 2002-129806, a linkage is formed at one end of the second lever. The lower end of the transmission rod is coupled to the linkage. As illustrated in FIG. 4 of JP 2002-129806, the pivot axis of the second lever is located frontward with respect to the pawl and extends in parallel to the pawl axis.

In this known vehicle door lock apparatus, when the transmission rod descends in response to the opening operation being performed on the exterior door handle and the lower end of the transmission rod pushes down the linkage of the second lever, the second lever pivots and the first lever, which is displaced upward, comes into contact with the lift lever. As a result, the pawl releases the fork and it is possible to open the door.

Incidentally, such a vehicle door lock apparatus may generally be used as both a vehicle door lock apparatus mounted on a front door and a vehicle door lock apparatus mounted on a rear door. Depending on the shape of the door on which the vehicle door lock apparatus is mounted, as illustrated in FIG. 1 of JP 2002-129806, the vehicle door lock apparatus is sometimes mounted on the door such that the fixing surface of the base plate is inclined relative to the vertical direction. In such a case, a plane of rotation, which contains an arcuate trajectory traced by the linkage of the second lever when it pivots in response to the opening operation being performed on the exterior door handle, is located farther in a frontward direction of the vehicle frame than the fixing surface of the base plate and is parallel to the fixing surface. Therefore, the plane of rotation is also inclined relative to the vertical direction.

Therefore, this plane of rotation is inclined relative to a plane that contains an arcuate trajectory traced by the upper end of the transmission rod when it pivots in response to the opening operation being performed on the exterior door handle (i.e. when the exterior door handle is manually pulled to open the door). Due to this arrangement, the transmission rod might be distorted when the opening operation is being performed on the exterior door handle; distortion of the transmission rod could lead to a deterioration of operation sensitivity (manual responsiveness), a loss of transmission stroke, etc. Therefore, in such a known vehicle door lock apparatus, a distorted transmission rod may impair the smooth transmission of the opening operation (pulling stroke) from the exterior door handle to the second lever via the distorted transmission rod.

SUMMARY OF THE INVENTION

In view of these circumstances, an object of the present teachings is to provide an improved vehicle door lock apparatus that can transmit an opening operation from an exterior door handle to a second lever via a transmission rod and can perform the opening of the door in a satisfactory manner.

In one embodiment of the present teachings, a vehicle door lock apparatus includes:

a housing including a base plate fixed in a state in which a fixing surface of the base plate abuts against a door that is openable and closable with respect to a vehicle frame, to which a striker is fixed, the base plate also having an entry opening, into which the striker can enter, formed therein;

a fork pivotably provided on the base plate and that is displaceable to a latched position, where the fork retains the striker in the entry opening, and to an unlatched position, where the fork allows the striker to separate from the entry opening;

a pawl pivotably provided in the base plate, the pawl fixing or releasing the fork;

a first lever displaceably provided in the housing, the first lever being capable of acting on the pawl when it is displaced and causing the pawl to release the fork; and a second lever pivotably provided in the housing, one end of the second lever being coupled to an exterior door handle via a transmission rod, the second lever being capable of acting on the first lever and displacing the first lever when it pivots in response to an opening operation being performed on the exterior door handle, wherein a linkage, which is coupled to a lower end of the transmission rod, is formed at the one end of the second lever, a plane of rotation, which contains an arcuate trajectory traced by the linkage when it pivots in response to the opening operation being performed, is located farther in a frontward direction of the vehicle frame than the fixing surface and the plane of rotation extends at an angle relative to a plane containing the fixing surface such that the plane of rotation intersects the plane of the fixing surface in a downward direction of the vehicle frame.

Other aspects and advantages of the present invention will be apparent from the embodiments disclosed in the following description and the attached drawings, the illustrations exemplified in the drawings, and the general concept or gist of the invention disclosed in the entire description and drawings.

BRIEF DESCRIPTION OF THE DRAWINGS

FIG. 17 is a schematic view for explaining the positional relationship of the door handle relative to the transmission rod in an embodiment in which the vehicle door lock apparatus of the first embodiment is mounted on, for example, a rear door.

DETAILED DESCRIPTION OF PREFERRED EMBODIMENTS

Embodiments of the present teachings will be explained below with reference to the drawings.

First Embodiment

Figure 1:
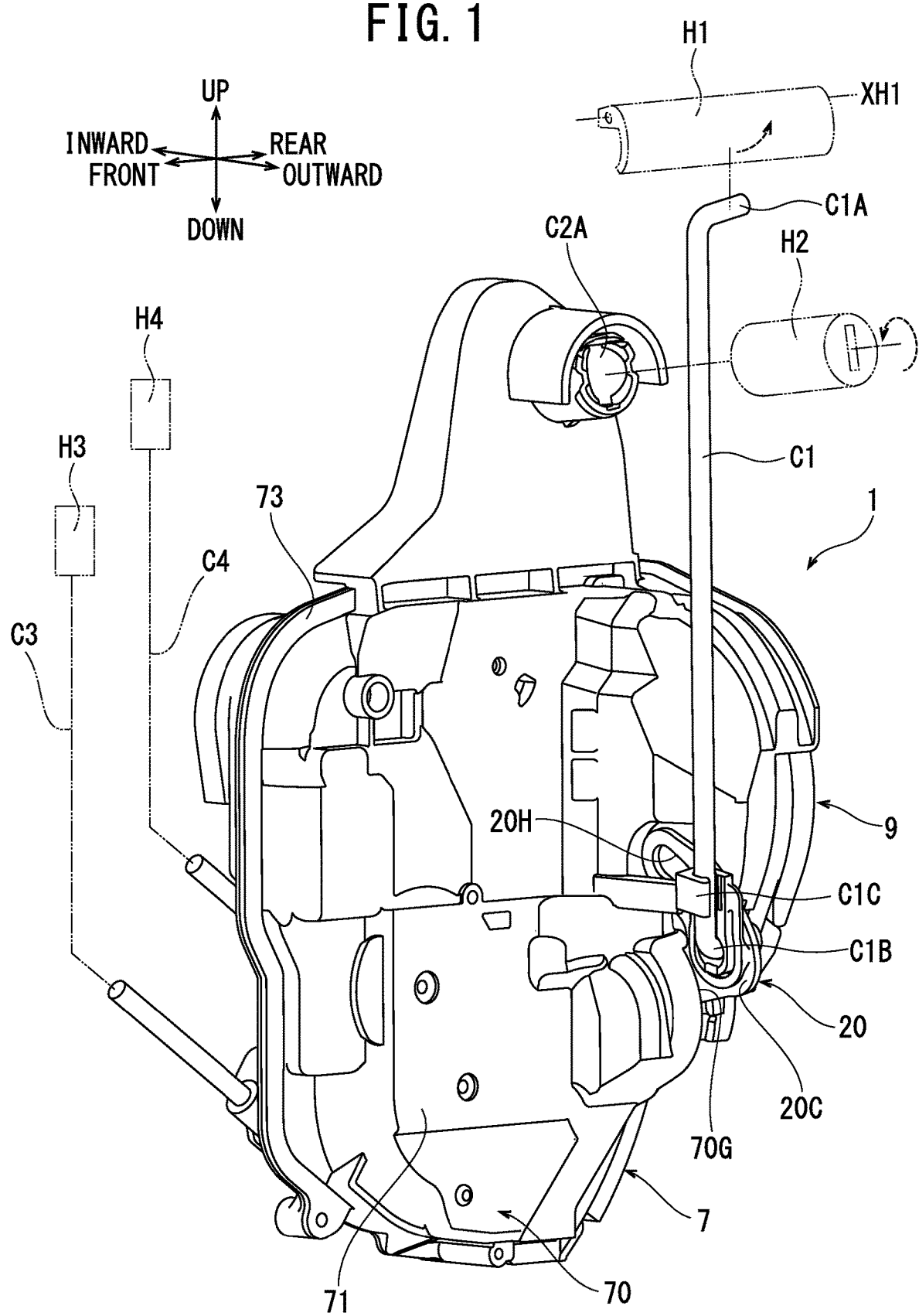
FIG. 1 is a perspective view of a vehicle door lock apparatus according to a first embodiment of the present teachings.
Figure 2:
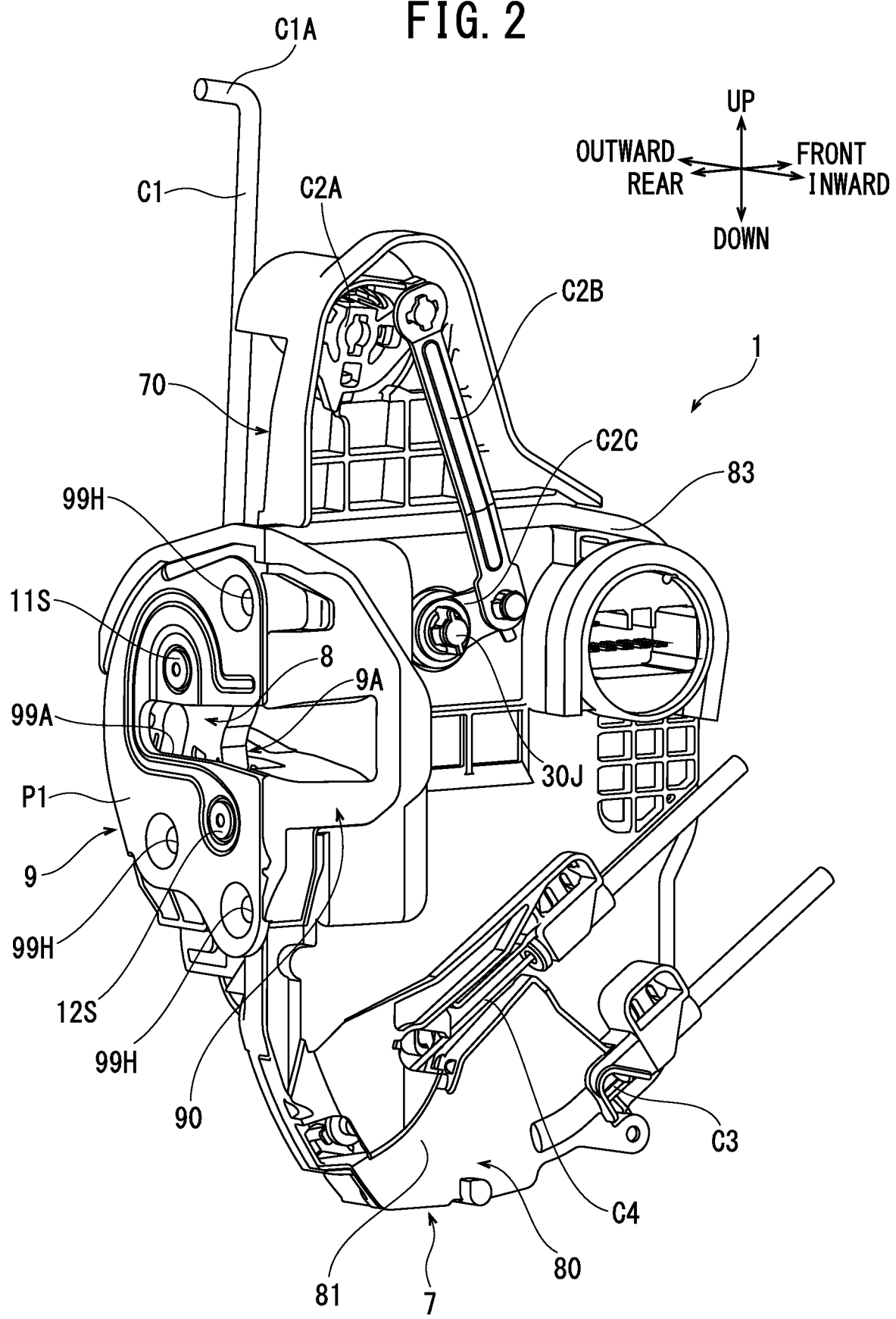
FIG. 2 is a perspective view of the vehicle door lock apparatus.

FIGS. 1 and 2 show a vehicle door lock apparatus 1 (hereinafter sometimes simply referred to as "door lock apparatus 1") according to a representative, non-limiting first embodiment of the present teachings. As shown, e.g., in FIGS. 16 and 17, the door lock apparatus 1 is configured to be affixed (attached) to a door (A1, A2) that is openable and closable relative to a vehicle frame (chassis) of a vehicle, such as an automobile, a bus, a commercial vehicle, a truck, etc. By retaining (latching or holding) a striker that is affixed to the vehicle frame, the door lock apparatus 1 is capable of retaining (holding) the door closed with respect to the vehicle frame.

In FIGS. 1 and 2, the door lock apparatus 1 is configured to be disposed on the inside at the rear end of the door provided on the left side surface of the vehicle frame. It is noted that, when another door lock apparatus 1 is affixed to the rear end of the door provided on the right side surface of the vehicle frame, the two door lock apparatuses 1 will be disposed in a mirror image state. In addition or in the alternative, the door lock apparatus 1 according to the present teachings can be provided in (on) a tail gate, or another portion of the vehicle.

The front-rear direction and the up-down direction shown in FIGS. 1 and 2 are based on the front-rear (longitudinal) direction and the up-down (vertical or height) direction of the vehicle. The vehicle inward-outward (lateral) direction shown in FIGS. 1 and 2 is based on a person sitting in the cabin of the vehicle. The left surface side of the vehicle is set as the vehicle exterior and the opposite side is set as the vehicle interior. The front-rear direction, the up-down direction, and the vehicle inward-outward direction shown in FIG. 3 and the reference directions shown in the subsequent Figures correspond to the reference directions shown in FIGS. 1 and 2.

As shown in FIG. 1, an exterior door handle H1 and a key cylinder H2 are disposed on the outer surface of a door (not shown in FIGS. 1 and 2; see FIGS. 16 and 17 for representative doors A1 and A2), to which the door lock apparatus 1 is affixed (attached). An interior door lock knob H3 and an interior door handle H4 are disposed on the inner (interior) surface of the door that is exposed to (faces) the cabin of the vehicle.

Figure 16:
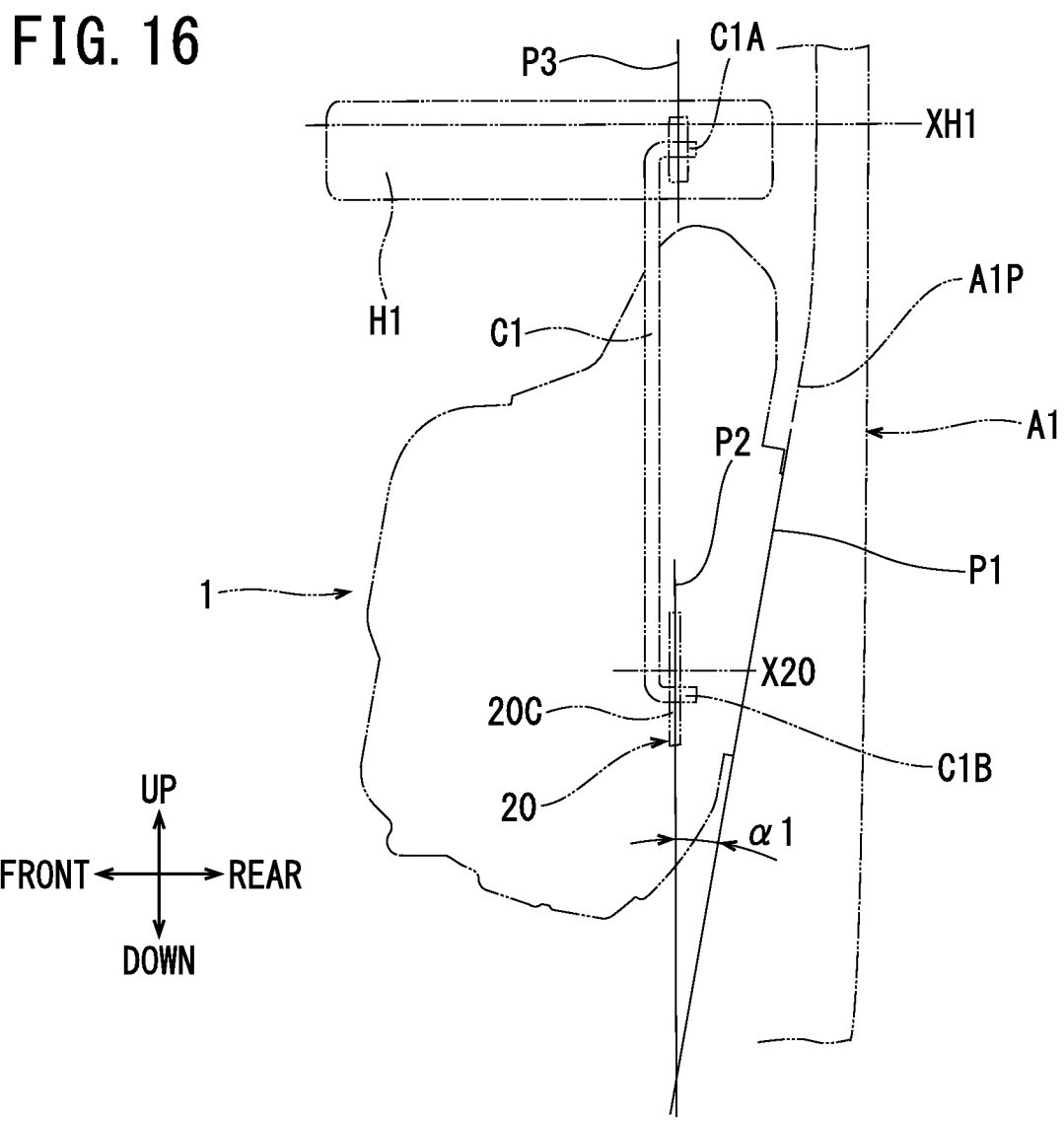
FIG. 16 is a schematic view for explaining the positional relationship of a door handle relative to a transmission rod in an embodiment in which the vehicle door lock apparatus of the first embodiment is mounted on, for example, a front door.

An upper end C1A of a transmission rod C1 is operably coupled to the exterior door handle H1. The door lock apparatus 1 is disposed downward of the exterior door handle H1 on the inside of the door (A1, A2), as shown in FIGS. 16 and 17. A lower end C1B of the transmission rod C1 is operably coupled to a linkage 20C of an outside ("O/S") open lever 20 of the door lock apparatus 1, as shown in FIGS. 1, 11-14, 16 and 17.

The key cylinder H2 is retained so as to be rotatable integrally with a key-cylinder retainer C2A, which is rotatably (turnably) provided at the upper end portion of the door lock apparatus 1. As shown in FIG. 2, the upper end of a link rod C2B is operably coupled to the key-cylinder retainer C2A. The lower end of the link rod C2B is connected via a link lever C2C to an outside ("O/S") lock lever 30, which will explained below with reference to FIG. 5, etc.

As shown in FIG. 1, a first end of a transmission cable C3 is connected to the interior door lock knob H3. A first end of a transmission cable C4 is connected to the interior door handle H4. As shown in FIG. 2, a second end of the transmission cable C3 is drawn into the door lock apparatus 1 and connected to an inside ("I/S") lock lever 35, which will be explained below with reference to FIG. 5, etc. A second end of the transmission cable C4 is drawn into the door lock apparatus 1 and connected to an inside ("I/S") open lever 25, which will also be explained below with reference to FIG. 5, etc.

The door lock apparatus 1 includes a latch housing 9, as shown in FIGS. 1-4, and an actuating housing 7, as shown in FIGS. 1, 2, and 5-8. As shown in FIGS. 1 and 2, the actuating housing 7 is assembled onto (joined to) the latch housing 9.

Figure 5:
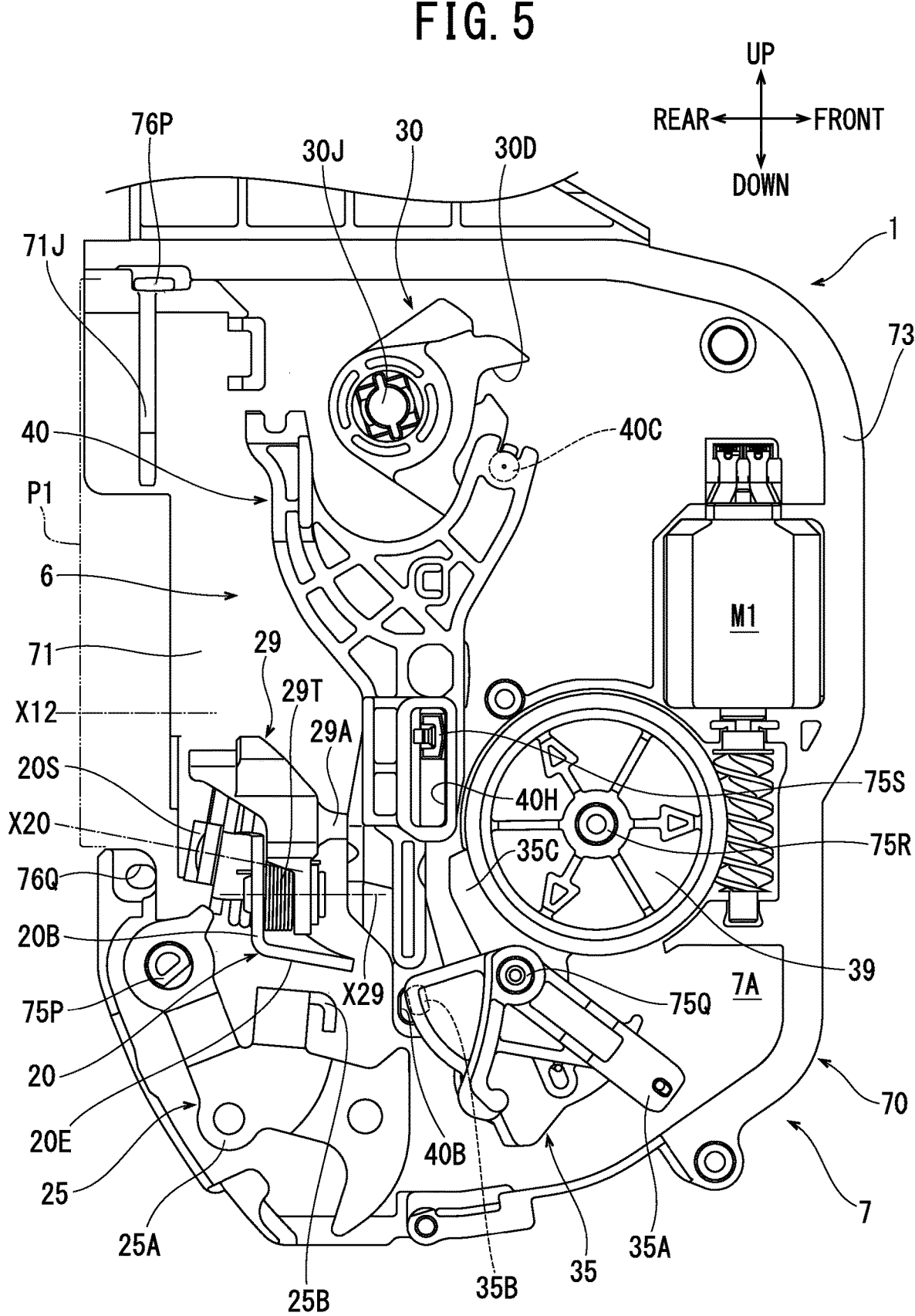
FIG. 5 is a front view of a first housing and an actuating mechanism of the first embodiment.
Figure 6:
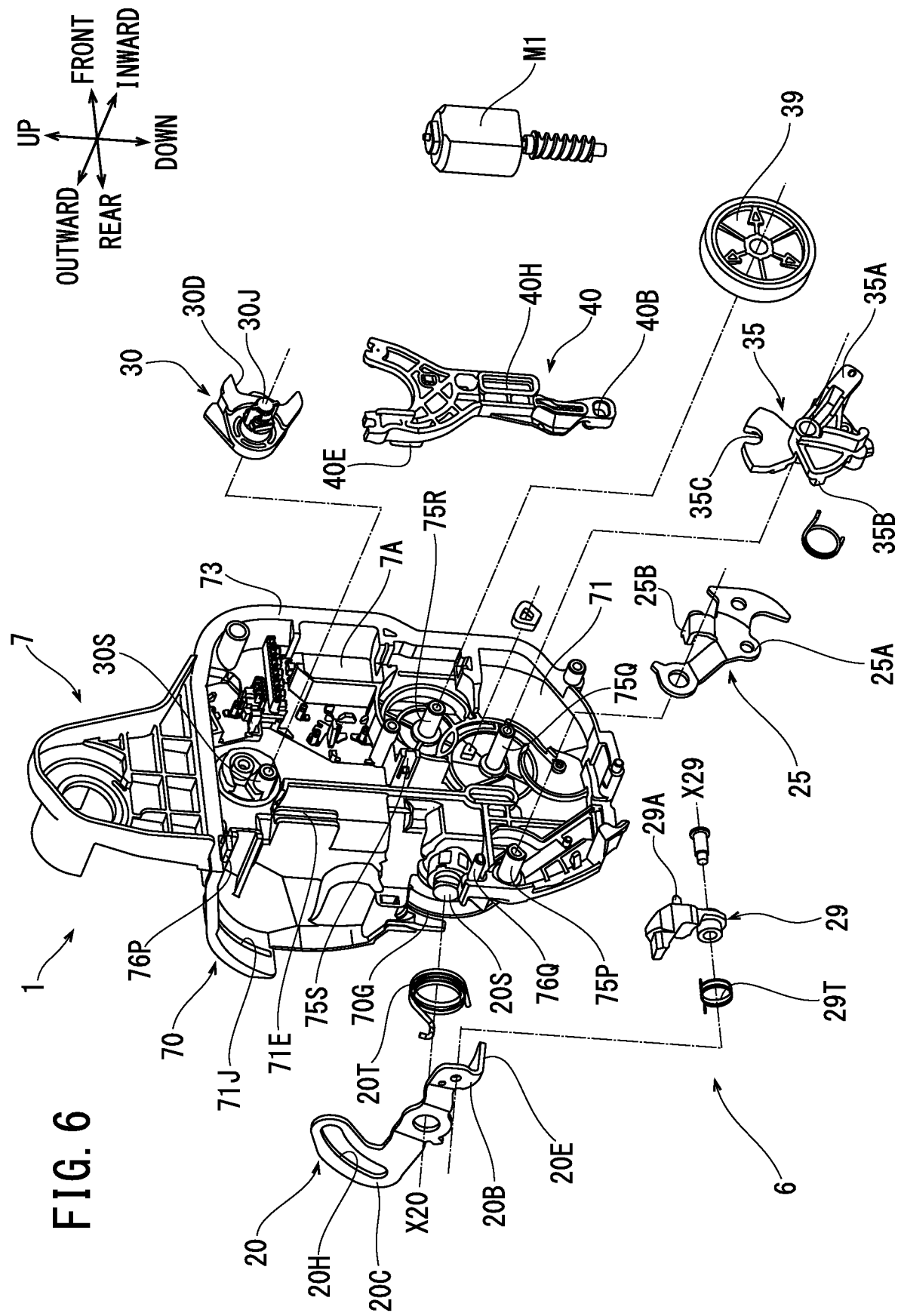
FIG. 6 is an exploded perspective view of the first housing and the actuating mechanism.
Figure 7:
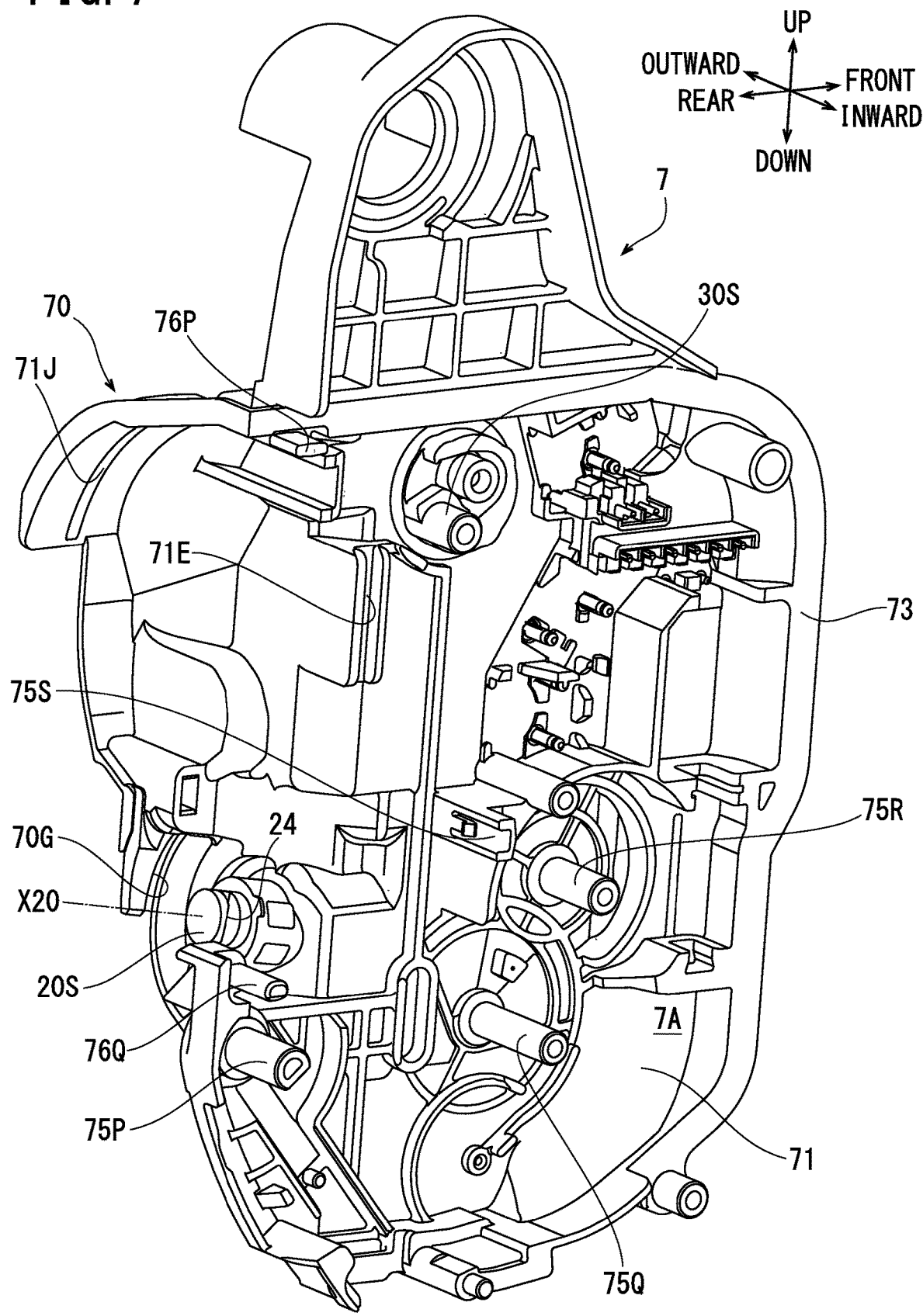
FIG. 7 is a perspective view of the housing.
Figure 8:
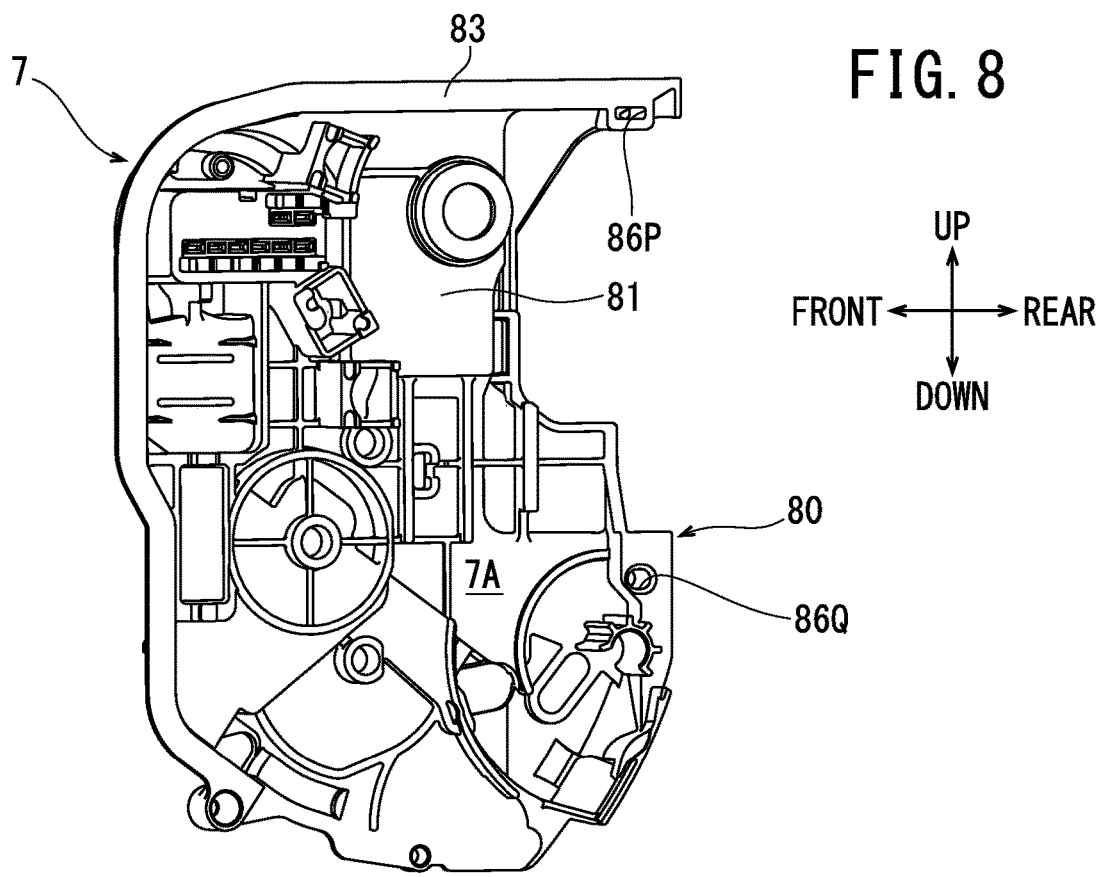
FIG. 8 is a perspective view of a second housing of the first embodiment.

As shown, e.g., in FIGS. 6-8, the actuating housing 7 includes a first housing 70 and a second housing 80, each made of resin. As shown in FIG. 7, the first housing 70 includes a first peripheral edge section 73 surrounding a first base wall 71. As shown in FIG. 8, the second housing 80 includes a second peripheral edge section 83 surrounding a second base wall 81. The second housing 80 is assembled onto (joined to) the first housing 70 by disposing the first base wall 71 opposite to the second base wall 81 and welding the first peripheral edge section 73 to the second peripheral edge section 83, whereby a housing chamber 7A is formed in the interior of the actuating housing 7. An actuating mechanism 6, as shown in FIGS. 5, 6, and 9-15, is housed in the housing chamber 7A.

Figure 4:
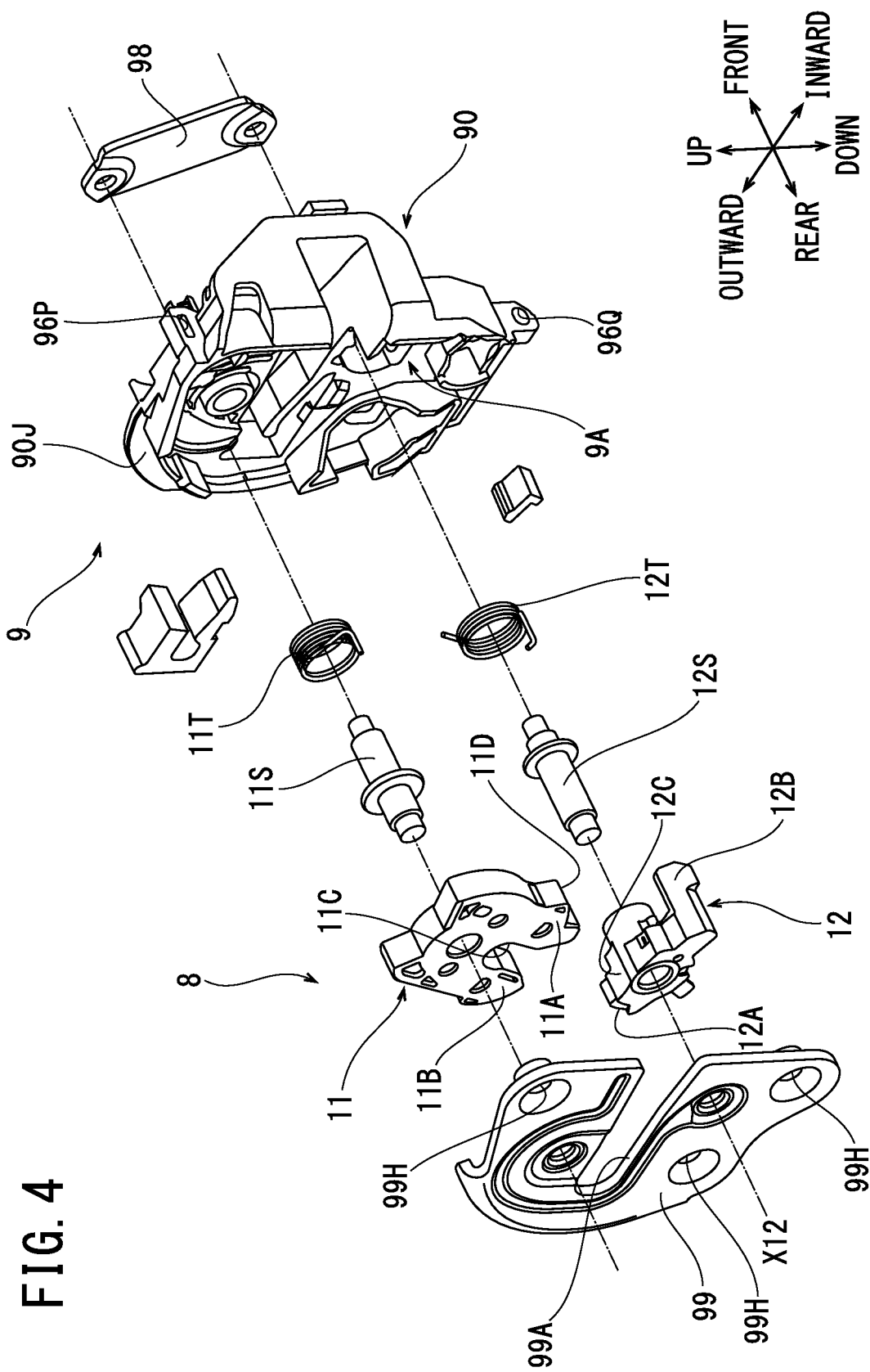
FIG. 4 is an exploded perspective view of the latch housing and the latch mechanism.

As shown in FIG. 4, the latch housing 9 includes a third housing 90 made of resin, as well as a base plate 99 and a back plate 98, which are each made from steel plate. A fork pivot shaft 11S and a pawl pivot shaft 12S are inserted through the third housing 90. The base plate 99 is disposed behind the third housing 90. The back plate 98 is disposed in front of the third housing 90. The rear end portions of the fork pivot shaft 11S and the pawl pivot shaft 12S are respectively crimped and thereby affixed to the base plate 99. The front end portions of the fork pivot shaft 11S and the pawl pivot shaft 12S are respectively crimped and thereby affixed to the back plate 98, whereby a latch chamber 9A is formed in the interior of the latch housing 9. A latch mechanism 8, as shown in FIGS. 2, 4, and 11-14, is housed in the latch chamber 9A.

As shown in FIGS. 5-7, first and second supports 76P and 76Q are formed in (on) the first housing 70. The first support 76P projects from the first base wall 71 near a rear and upper end portion in the first peripheral edge section 73 of the first housing 70. The second support 76Q projects from the first base wall 71 near a rear and lower end portion in the first peripheral edge section 73 of the first housing 70. The first and second supports 76P and 76Q each extend toward the second base wall 81 of the second housing 80.

Figure 3:
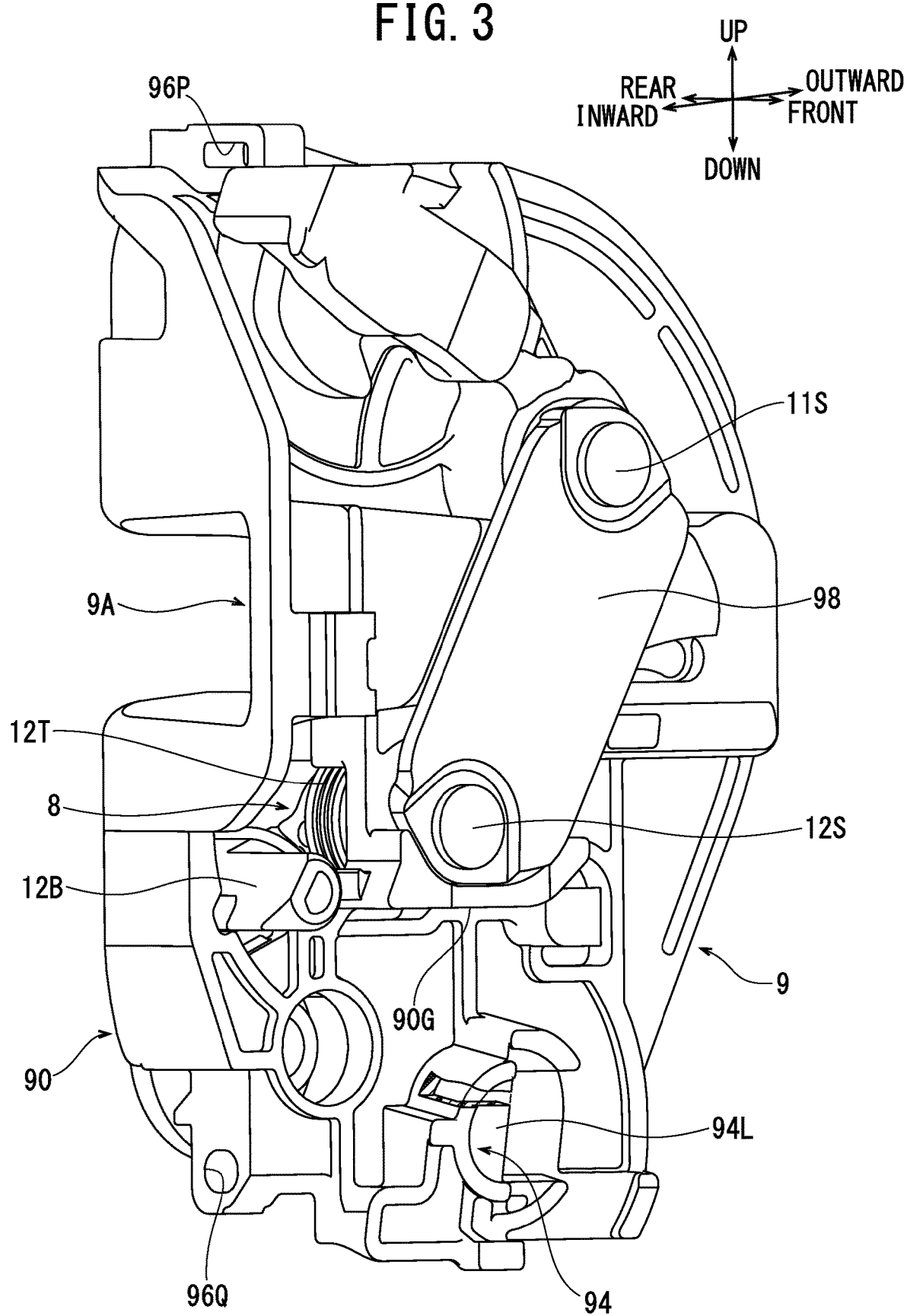
FIG. 3 is a perspective view of a latch housing and a latch mechanism of the first embodiment.

As shown in FIGS. 3 and 4, first and second insertion-through holes 96P and 96Q are formed in the third housing 90. The first insertion-through hole 96P penetrates through the upper end of the third housing 90 in the vehicle inward-outward direction. The second insertion-through hole 96Q penetrates through the lower end of the third housing 90 in the vehicle inward-outward direction.

As shown in FIG. 8, first and second slip-off preventing parts 86P and 86Q are formed as recesses (holes) in the second housing 80. The first slip-off preventing part 86P is a recess (hole) formed near a rear and upper end of the second peripheral edge section 83 of the second housing 80. The first slip-off preventing part 86P is aligned with the distal end of the first support 76P. The second slip-off preventing part 86Q is a recess (hole) formed near a rear and lower end of the second peripheral edge section 83 of the second housing 80. The second slip-off preventing part 86Q is aligned with the distal end of the second support 76Q.

Before the second housing 80 is assembled onto the first housing 70, the third housing 90 is provisionally assembled (mounted) onto the first housing 70. As shown, e.g., in FIG. 7, the first housing 70 includes a groove-like guide 71J formed in the rear end portion of the first base wall 71. As shown in FIG. 4, a rib 90J protrudes from an upper end face of the third housing 90 towards the vehicle exterior. By moving the third housing 90 towards to the first housing 70 while guiding the rib 90J into the guide 71J, the third housing 90 can be provisionally assembled with the first housing 70 in the proper position (orientation).

As a result, the intermediate segment of the first support 76P of the first housing 70 is inserted through the first insertion-through hole 96P of the third housing 90. Similarly, the intermediate segment of the second support 76Q of the first housing 70 is inserted through the second insertion-through hole 96Q of the third housing 90.

Subsequently, when the second housing 80 is assembled (mounted) onto the first housing 70, the distal end of the first support 76P of the first housing 70 is fit into the first slip-off preventing part 86P of the second housing 80. The distal end of the second support 76Q of the first housing 70 is fit into the second slip-off preventing part 86Q of the second housing 80. The first peripheral edge section 73 of the first housing 70 and the second peripheral edge section 83 of the second housing 80 are welded together, whereby the third housing 90 is joined to the first housing 70 and the second housing 80.

As shown, e.g., in FIGS. 2 and 4, the base plate 99 of the latch housing 9 has a fixing surface P1, and also includes a plurality of fixing holes 99H and an entry opening 99A formed in the base plate 99. The fixing surface P1 is formed on the surface that faces rearward of the base plate 99. Although the surface facing rearward of the base plate 99 is uneven, the fixing surface P1 is a flat surface designed to contact (abut) the rear end face of the door. Not-shown set screws are inserted through the rear end face of the door and are screwed into the fixing holes 99H of the base plate 99, whereby the door lock apparatus 1 is affixed to the door such that the fixing surface P1 contacts (abuts against) the rear end face of the door and such that the entry opening 99A is exposed at the rear end face of the door. When the door lock apparatus 1 moves in response to opening and closing of the door, the striker fixed to the vehicle frame respectively separates from or enters into the entry opening 99A.

For example, in an embodiment in which the door lock apparatus 1 is mounted on a front door A1 as shown in FIG. 16, the fixing surface P1 contacts the rear end face A1P of the front door A1. The rear end face A1P has a shape that corresponds to (is complementary to) the shape of the so-called "B pillar" of the vehicle frame that vertically extends between a front seat opening and a rear seat opening in the vehicle frame. The rear end face A1P is slightly inclined with respect to the vertical direction. Therefore, the fixing surface P1 is also inclined at a small angle with respect to the vertical direction along the rear end face A1P.

In an alternate embodiment in which the door lock apparatus 1 is mounted on a rear door A2 as shown in FIG. 17, the fixing surface P1 contacts the rear end face A2P of the rear door A2. The rear end face A2P has a shape that corresponds to (is complementary to) the shape of a rear tire housing of the vehicle frame. The rear end face A2P is inclined at a large angle with respect to the vertical direction. Therefore, the fixing surface P1 is also inclined at a large angle with respect to the vertical direction along the rear end face A2P.

As shown in FIG. 4, the latch mechanism 8 includes a fork 11 and a pawl 12. The fork 11 is pivotably supported by a fork pivot shaft 11S, which is disposed above the entry opening 99A. A torsion coil spring 11T is attached to the fork pivot shaft 11S. The pawl 12 is pivotably supported by the pawl pivot shaft 12S, which is disposed below the entry opening 99A. The pawl pivot shaft 12S defines a pawl axis X12 that is at least substantially orthogonal to the fixing surface P1. A torsion coil spring 12T is attached to the pawl pivot shaft 12S.

Figure 11:
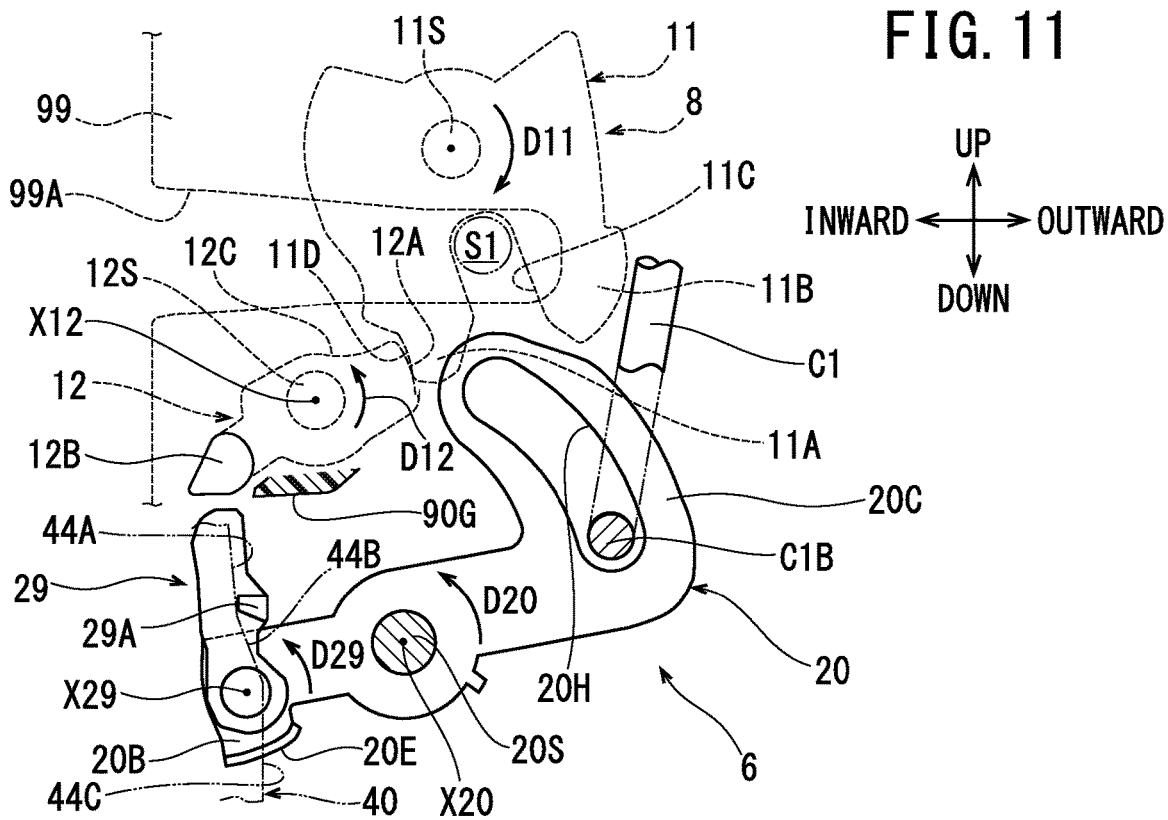
FIG. 11 is a first schematic view for explaining the operations of an outside ("O/S") open lever, an inertial lever, a fork, and a pawl of the first embodiment.

As shown in FIGS. 11-14, the fork 11 is urged (biased) by the torsion coil spring 11T so as to pivot about the fork pivot shaft 11S in the direction D11. The portion of the fork 11 that is located on the side of the entry opening 99A has an inner convex segment 11A and an outer convex segment 11B. A striker S1, which is shown in FIG. 11 as having entered into the entry opening 99A, fits in a cutout 11C formed between the inner convex segment 11A and the outer convex segment 11B. In the state shown in FIG. 11, the fork 11 retains the striker S1 at the bottom of the entry opening 99A. A latch surface 11D configured to come into contact with a stopper surface 12A, which will be explained below, is formed at (on) the distal end of the inner convex segment 11A that faces the pawl 12.

The pawl 12 is urged (biased) by the torsion coil spring 12T so as to pivot about the pawl pivot shaft 12S in the direction D12 and holds the posture (orientation) shown in FIG. 11.

The stopper surface 12A is formed in (on) a portion of the pawl 12 that is directed towards the bottom of the entry opening 99A in the orientation shown in FIG. 11. The stopper surface 12A is formed so as to face the latch surface 11D. An arc forming the stopper surface 12A is cut on the side that faces the fork 11. A sliding surface 12C that extends towards the pawl pivot shaft 12S is formed starting from the part (location) where the arc is cut. A contacted portion 12B is formed on the pawl 12 on the side that is opposite of the stopper surface 12A across the pawl pivot shaft 12S. As shown in FIG. 4, the contacted portion 12B projects forward and has a columnar shape. As shown in FIG. 3, the front end of the contacted portion 12B projects frontward from the latch chamber 9A through the third housing 90 and enters the housing chamber 7A.

Referring again to FIG. 11, when the fork 11 retains (holds) the striker S1 at the bottom of the entry opening 99A, the stopper surface 12A comes into contact with the latch surface 11D of the inner convex segment 11A, whereby the pawl 12 prevents the fork 11 from pivoting in the direction D11. The position of the fork 11 shown in FIG. 11 is the latch position that holds the striker S1 in the entry opening 99A.

Figure 12:
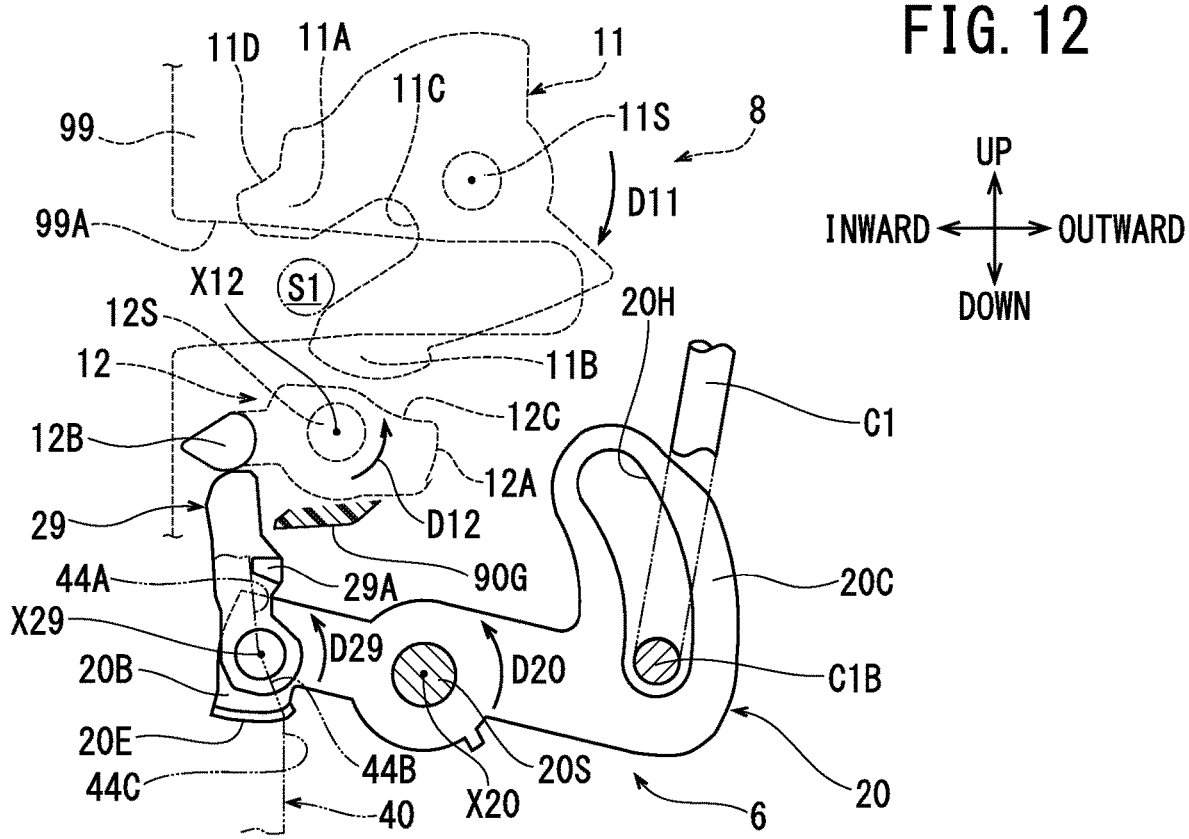
FIG. 12 is a second schematic view for explaining the operations of the O/S open lever, the inertial lever, the fork, and the pawl.

As shown in FIG. 12, when an inertial lever 29, which will be explained below, comes into contact with the contacted portion 12B of the pawl 12 and pushes the contacted portion 12B up, the pawl 12 pivots about the pawl pivot shaft 12S in the direction opposite of the direction D12 by overcoming the urging force of the torsion coil spring 12T. At this time, since the stopper surface 12A separates from the latch surface 11D, the pawl 12 no longer blocks the pivoting movement of the fork 11. Therefore, the fork 11 pivots about the fork pivot shaft 11S in the direction D11 due to the urging force of the torsion coil spring 11T so as to displace to the unlatch position, where the striker S1 is permitted (released) to move out of (exit) the entry opening 99A.

Conversely, when the striker S1 enters the entry opening 99A, the striker S1 pushes against the outer convex segment 11B, thereby causing the fork 11 to pivot in the direction opposite of the direction D11 and to return from the unlatch position shown in FIG. 12 to the latch position shown in FIG. 11. At this time, the distal end of the outer convex segment 11B and then the distal end of the inner convex section 11A sequentially come into slide-contact with the sliding surface 12C. When the inner convex segment 11A separates from the sliding surface 12C, the pawl 12 pivots in the direction D12 and returns to the original posture shown in FIG. 11. Therefore, the stopper surface 12A comes into contact with the latch surface 11D and fixes the pivoting movement of the fork 11 in the latch position. As a result, the latch mechanism 8 holds the door closed with respect to the vehicle frame.

As shown in FIGS. 5, 6, 9, and 10, the actuating mechanism 6 includes the O/S open lever 20, the I/S open lever 25, the inertial lever 29, the O/S lock lever 30, the I/S lock lever 35, a linearly moving lock lever 40, an electric motor M1, and a worm wheel 39. The inertial lever 29 is a representative, non-limiting example of a "first lever" according to the present teachings. The O/S open lever 20 is a representative, non-limiting example of a "second lever" according to the present teachings.

As shown in FIGS. 6 and 7, the first housing 70 includes an outside ("O/S") open lever pivot shaft 20S that projects rearward at (from) a rear and lower portion of the first base wall 71. The O/S open lever pivot shaft 20S defines a second axis X20. Although the latch housing 9 is not shown in FIG. 5, the positions of the fixing surface P1 and the pawl axis X12 are shown relative to the actuating mechanism 6. The second axis X20 is inclined upward in the rearward direction and is inclined with respect to the pawl axis X12, which is at least substantially orthogonal to the fixing surface P1.

As shown in FIGS. 5 to 7, a first shaft 75P is formed in (on) a rear and lower part of the first base wall 71 of the first housing 70. A second shaft 75Q is formed in (on) a part of the first base wall 71 that is farther forward than the first shaft 75P. A third shaft 75R and a fourth shaft 75S are formed in (on) a part located substantially in the center of the first base wall 71. The first shaft 75P, the second shaft 75Q, the third shaft 75R, and the fourth shaft 75S respectively extend toward the second base wall 81 of the second housing 80.

The O/S open lever 20 is pivotably supported by the O/S open lever pivot shaft 20S. As shown in FIG. 6, a torsion coil spring 20T is attached to the O/S open lever pivot shaft 20S. As shown in FIG. 11, the O/S open lever 20 is urged (biased) by the torsion coil spring 20T so as to pivot about the O/S open lever pivot shaft 20S in the direction D20.

As shown in FIG. 7, a fitting groove 24 is formed as a recess in the O/S open lever pivot shaft 20S. As shown in FIG. 3, a shaft receptacle 94, in which a fitting plate 94L is provided, is formed in the third housing 90. Although not shown in the Figures, the fitting groove 24 of the O/S open lever pivot shaft 20S fits with the fitting plate 94L of the shaft receptacle 94, whereby the O/S open lever 20 is prevented from slipping off from the O/S open lever pivot shaft 20S.

As shown in FIGS. 1 and 11, a first end of the O/S open lever 20 is located on the vehicle outward side and projects to the outside of the actuating housing 7. The linkage (coupling part) 20C is formed at the first end. An arcuate elongated hole 20H penetrates through the linkage 20C; the center of an imaginary circle, along which the arc extends, is located on the second axis X20. The lower end C1B of the transmission rod C1 is bent rearward and coupled to the linkage 20C by being inserted into the elongated hole 20H with a resin clip C1C (shown in FIG. 1) securing it.

The lower end C1B of the transmission rod C1 pushes the linkage 20C downward in response to an opening operation being performed on the exterior door handle H1, whereby the linkage 20C is displaced such that it traces an arcuate trajectory having its center on (at) the second axis X20. FIGS. 16 and 17 show a plane P2 of rotation, which contains the arcuate trajectory traced by the linkage 20C when it pivots in response to the opening operation being performed on the exterior door handle H1. The second axis X20 is orthogonal to the plane P2 of rotation. As shown in FIGS. 16 and 17, the plane P2 of rotation is located farther in the forward direction of the vehicle frame than the fixing surface P1. Furthermore, the plane P2 of rotation extends at an angle relative to a plane containing the fixing surface P1 such that the plane P2 of rotation approaches (intersects) the plane of the fixing surface P1 in the downward direction.

In this embodiment, an inclination angle α1 of the plane P2 of rotation with respect to the plane containing the fixing surface P1 is 5° or more and 15° or less.

As shown in FIGS. 16 and 17, the transmission rod C1 may be formed such that it has a variety of bent shapes, in accordance with the particular application of the present teachings, as long as the lower end C1B extends in a direction that is at least substantially orthogonal to the plane P2 of rotation and the lower end C1B is inserted into the elongated hole 20H of the linkage 20C, thereby adapting the door lock apparatus 1 to the particular shape of the door on which the door lock apparatus 1 is mounted. The direction that is at least substantially orthogonal to the plane P2 of rotation is a direction that is at least substantially parallel to the second axis X20. For example, in FIG. 16, the transmission rod C1 extends vertically downward (or at least nearly vertically downward) from the upper end C1A. The lower end C1B of the transmission rod C1 is bent at least substantially at a right angle and extends in a direction that is at least substantially orthogonal to the plane P2 of rotation. In FIG. 17, the transmission rod C1 first extends vertically downward (or at least nearly vertically downward) from the upper end C1A, is then bent to be inclined slightly rearward and then is bent to be inclined slightly frontward, before being bent to extend substantially rearward at the lower end C1B. In particular, the transmission rod C1 is bent above the linkage 20C of the O/S open lever 20 and extends downward while being inclined slightly frontward so as to be generally parallel to the linkage 20C. The lower end C1B of the transmission rod C1 is bent substantially at a right angle and extends in a direction that is at least substantially orthogonal to the plane P2 of rotation. It is noted that the design of the resin clip C1C shown in FIG. 1 is capable of securing a variety of shapes of transmission rods C1, although only two exemplary shapes thereof are shown in FIGS. 16 and 17.

As shown in FIGS. 16 and 17, the exterior door handle H1 is pivotably supported about a handle axis XH1 that typically extends at least substantially horizontally in the front-rear direction of the vehicle. Therefore, in general, a plane P3, which contains an arcuate trajectory traced by the upper end C1A of the transmission rod C1 that is coupled to the exterior door handle H1 when the upper end C1A pivots in response to the opening operation being performed on the exterior door handle H1, extends at least substantially in the vertical direction.

Referring again to FIG. 7, a movement guide (displacement guide) 70G is formed in the first base wall 71 of the first housing 70. The movement guide 70G is formed in a part of the first base wall 71 that is located on the vehicle outward side with respect to the O/S open lever pivot shaft 20S and has an arcuate slit shape. The center of an imaginary circle, along which the arcuate slit extends, is located on (at) the second axis X20. In other words, the movement guide 70G is formed as a recess (curved slot) that is contained within, or is at least substantially in parallel to, the plane P2 of rotation shown in FIGS. 16 and 17. As shown in FIG. 1, the movement guide 70G surrounds a portion of the O/S open lever 20 that is adjacent to the linkage 20C and guides the pivoting movement of the O/S open lever 20 about the second axis X20.

Figure 15:
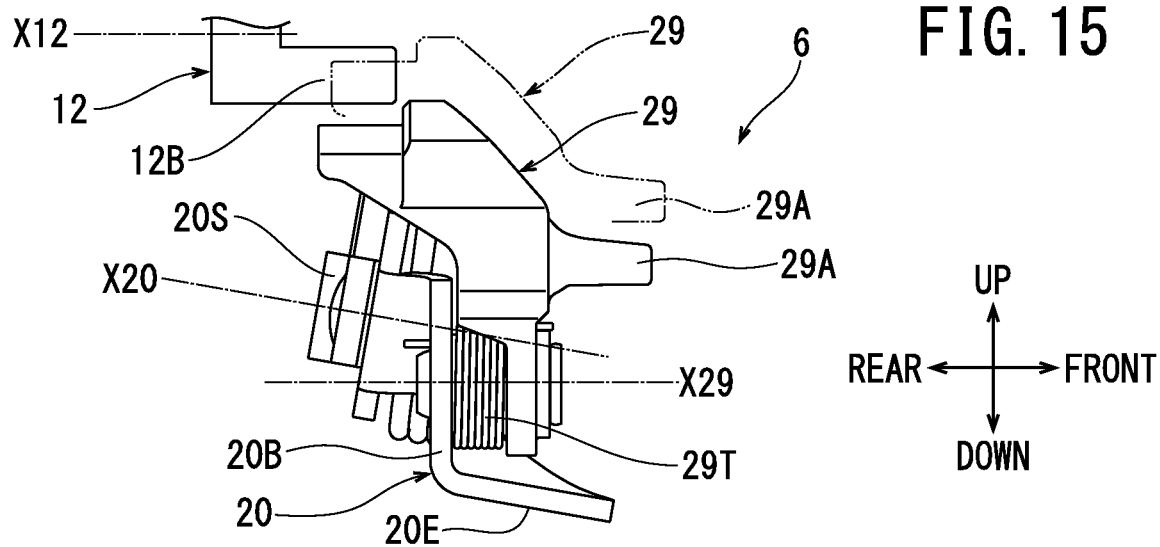
FIG. 15 is a schematic view for explaining a change in the positional relationships of the O/S open lever, the inertial lever, and the pawl relative to each other.

As shown in FIGS. 5 and 6, the inertial lever 29 is supported by the other end 20B of the O/S open lever 20 so as to be pivotable about a first axis X29 extending in the front-rear direction. As shown in FIG. 11, a torsion coil spring 29T (see FIG. 6) urges (biases) the inertial lever 29 so as to pivot about the first axis X29 in the direction D29. As shown in FIGS. 5 and 15, the first axis X29 is at least substantially parallel to the pawl axis X12. The second axis X20 is inclined with respect to the first axis X29.

When the exterior door handle H1 is operated (e.g., manually pulled) to open the door and the transmission rod C1 has moved downward as shown in FIG. 12, the linkage 20C of the O/S open lever 20 is pushed down too. The O/S open lever 20 pivots in the direction opposite of the direction D20, thereby raising the inertial lever 29. The inertial lever 29 is displaced from the position indicated by a solid line in FIG. 15 to the position indicated by an alternating long dash and two short dashes line in FIG. 15. That is, the inertial lever 29 rises while being inclined upward and frontward according to the inclination of the second axis X20 with respect to the pawl axis X12. At this time, the upper end surface of the inertial lever 29 is maintained in a state of being at least substantially parallel to the lower end surface of the pawl 12. Since the first axis X29 is at least substantially parallel to the pawl axis X12, even when the inertial lever 29 pivots about the first axis X29 to the position indicated by the alternating long dash and two short dashes line in FIG. 15, the upper end surface of the inertial lever 29 is maintained in a state of being at least substantially parallel to the lower end surface of the pawl 12.

As shown in FIGS. 5 and 6, the I/S open lever 25 is pivotably supported by the first shaft 75P. The second end of the transmission cable C4 (see FIGS. 1 and 2) is operably coupled to one end 25A of the I/S open lever 25 that is spaced downward from the first shaft 75P. That is, the I/S open lever 25 is operably coupled to the interior door handle H4 via the transmission cable C4.

As shown in FIGS. 5 and 6, an operating part 25B is formed on a part above the one end 25A of the I/S open lever 25. The I/S open lever 25 pivots counterclockwise when the interior door handle H4 is operated (e.g., manually pulled) to open the door. Consequently, the operating part 25B pushes the other end 20B of the O/S open lever 20 up and raises the inertial lever 29.

As shown in FIG. 5, a lower surface 20E on the other end 20B of the O/S open lever 20 is designed to contact the operating part 25B; the lower surface 20E extends at least substantially parallel to the second axis X20 in the front-rear direction and is inclined slightly downward. Consequently, the force imparted by the operating part 25B to push up the other end portion 20B of the O/S open lever 20 is reliably transmitted to the O/S open lever 20.

As shown in FIGS. 6 and 7, the first housing 70 also includes an outside ("O/S") lock lever pivot shaft 30S that projects from an upward portion of the first base wall 71 toward the vehicle interior.

As shown in FIGS. 5 and 6, the O/S lock lever 30 is pivotably supported by the O/S lock lever pivot shaft 30S. An engaging concave segment 30D is formed as a recess in the O/S lock lever 30 and bends in the radial inward direction. The O/S lock lever 30 includes a coupling shaft 30J that projects toward the vehicle interior. As shown in FIG. 2, the coupling shaft 30J projects outward of the second housing 80. The link lever C2C is fixed to the distal end portion of the coupling shaft 30J so as to be integrally rotatable therewith.

Referring to FIG. 5, the O/S lock lever 30 pivots counterclockwise in response to a locking operation being performed on the key cylinder H2. On the other hand, the O/S lock lever 30 pivots clockwise in response to an unlocking operation being performed on the key cylinder H2.

As shown in FIGS. 5 and 6, the I/S lock lever 35 is pivotably supported by the second shaft 75Q. The second end of the transmission cable C3 (shown in FIGS. 1 and 2) is coupled to one end 35A of the I/S lock lever 35. That is, the I/S lock lever 35 is operably coupled to the interior door lock knob H3 via the transmission cable C3. The I/S lock lever 35 pivots from the position shown in FIG. 5 to the position shown in FIG. 10 in response to a locking operation being performed on the interior door lock knob H3. The I/S lock lever 35 pivots from the position shown in FIG. 10 to the position shown in FIG. 5 in response to an unlocking operation being performed on the interior door lock knob H3.

Figure 9:
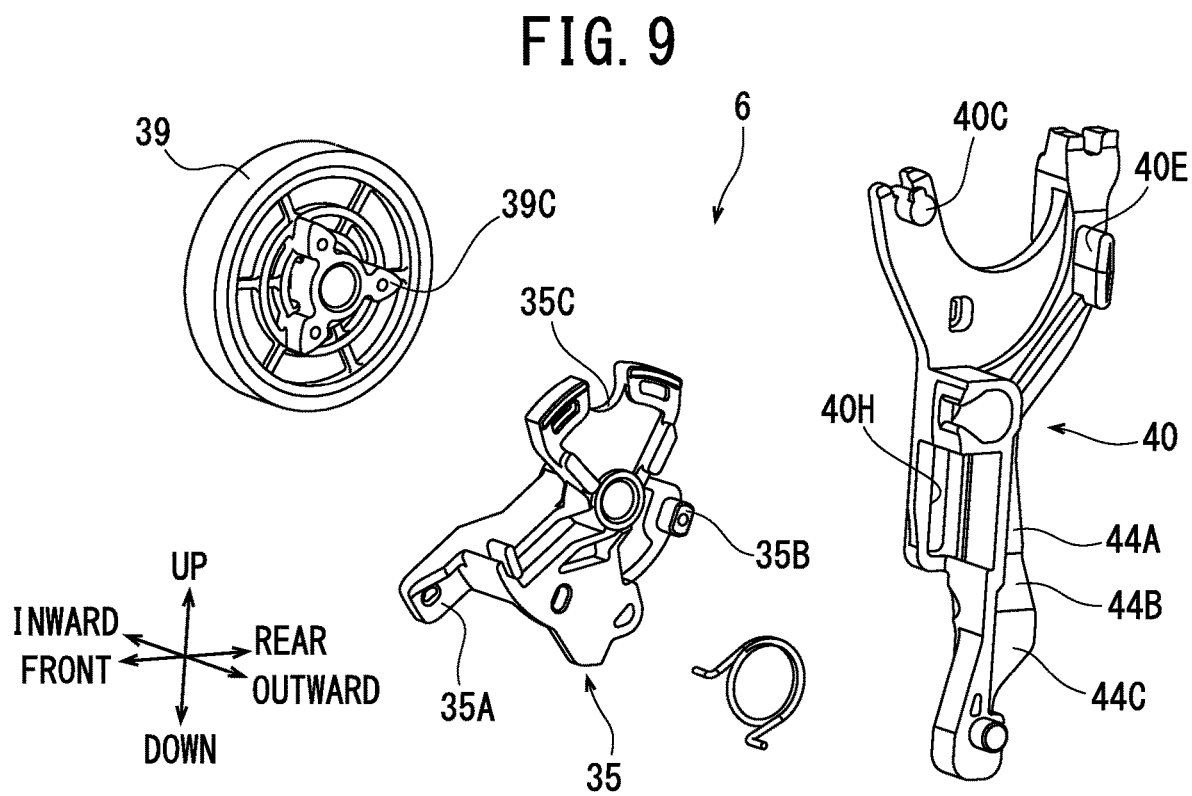
FIG. 9 is an exploded perspective view of a worm wheel, an inside ("I/S") lock lever, and a linearly moving lock lever of the first embodiment.

As shown in FIGS. 5 and 6, a cam 35C is formed in an upper part of the I/S lock lever 35. As shown in FIG. 9, an operating part 35B projects toward the vehicle exterior from the surface of the I/S lock lever 35 that faces the vehicle exterior.

As shown in FIGS. 5 and 6, the worm wheel 39 is rotatably (turnably) supported by the third shaft 75R. As shown in FIG. 9, a cam section 39C configured to engage with the cam 35C of the I/S lock lever 35 is formed on the surface of the worm wheel 39 that faces the vehicle exterior. When the electric motor M1 is actuated in response to a locking operation or a unlocking operation requested by a remote control key or the like, the worm wheel 39 is driven by the electric motor M1 to rotate and thereby turns (pivots) clockwise or counterclockwise. Due to the engagement of the cam section 39C and the cam 35C, the worm wheel 39 causes the I/S lock lever 35 to pivot between the position shown in FIG. 5 and the position shown in FIG. 10.

As shown in FIGS. 5 and 6, the fourth shaft 75S is inserted through an elongated hole 40H that extends in the up-down direction, whereby the linearly moving lock lever 40 is supported by the fourth shaft 75S so as to be linearly movable. The fourth shaft 75S has a substantial "C" shaped cross-section. The linearly moving lock lever 40 has a substantial "Y" shape that forks above the elongated hole 40H.

As shown in FIGS. 6 and 9, a linearly moving convex segment 40E projects toward the vehicle exterior from a part of the linearly moving lock lever 40 that branches rearward and upward. As shown in FIG. 7, a linear-movement guide groove 71E extends in the up-down direction at a location that is upward and rearward relative to the fourth shaft section 75S; the linear-movement guide groove 71E is formed as recess in the first base wall 71 of the first housing 70. The linearly moving convex segment 40E is guided by the linear-movement guide groove 71E, whereby the linearly moving lock lever 40 is capable of linearly moving in the up-down direction without inclining (tilting).

As shown in FIGS. 5 and 6, a concave recess 40B is formed in the lower end portion of the linearly moving lock lever 40. As shown in FIG. 5, the operating part 35B of the I/S lock lever 35 engages in the concave recess 40B.

Figure 10:
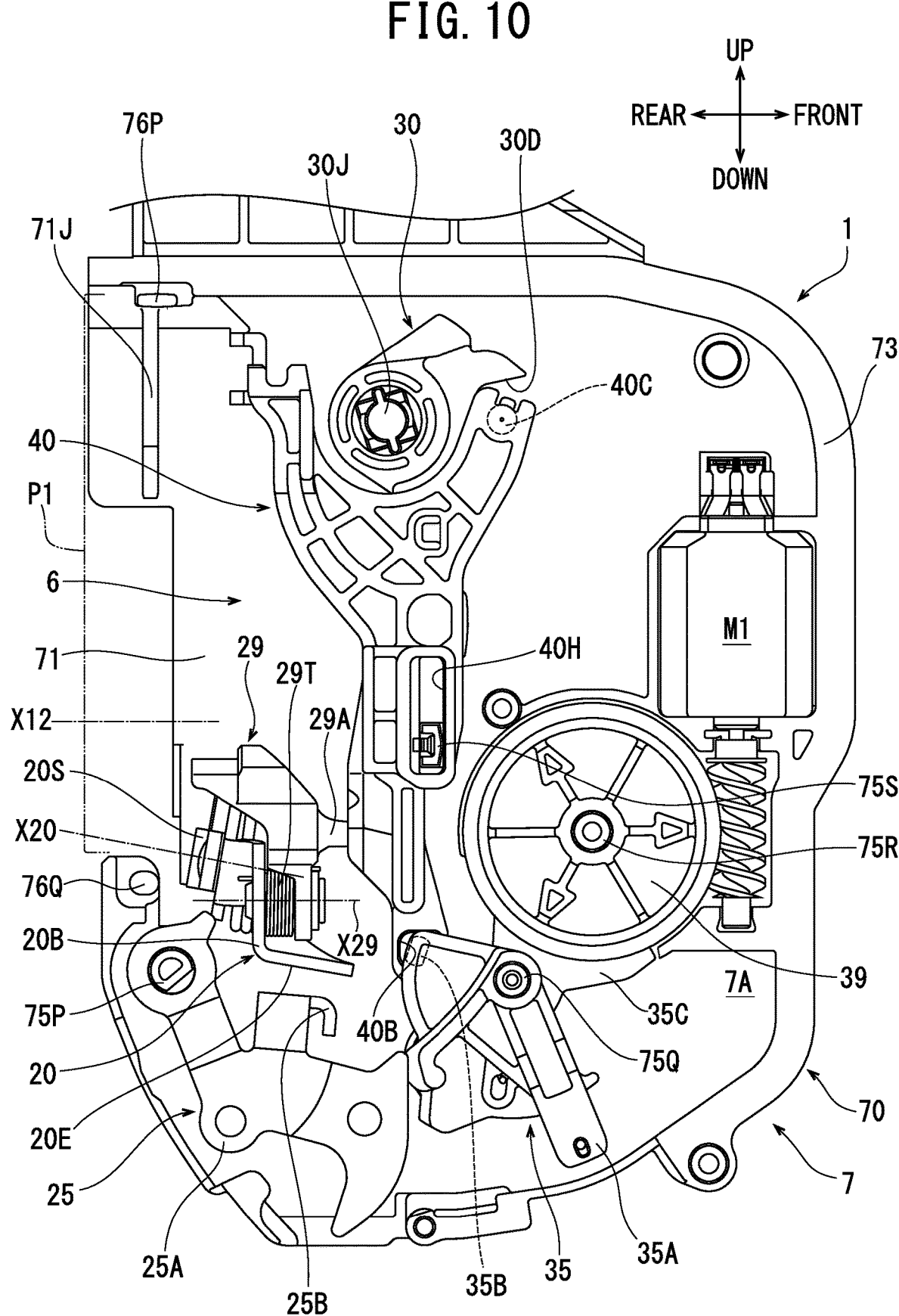
FIG. 10 is a front view of the first housing and the actuating mechanism.

As shown in FIG. 9, an engaging convex part 40C projects toward the vehicle exterior at the distal end of a part of the linearly moving lock lever 40 that branches forward and upward. As shown in FIGS. 5 and 10, the engaging convex part 40C projects into the engaging concave segment 30D of the O/S lock lever 30.

When the I/S lock lever 35 pivots from the position shown in FIG. 5 to the position shown in FIG. 10 in response to a locking operation being performed on the interior door lock knob H3 or a locking operation requested by the remote control key or the like, the displacement of the I/S lock lever 35 is transmitted to the linearly moving lock lever 40 via the concave recess 40B and the operating part 35B. As a result thereof, the linearly moving lock lever 40 is pushed up from the position shown in FIG. 5 to the position shown in FIG. 10.

When the I/S lock lever 35 pivots from the position shown in FIG. 10 to the position shown in FIG. 5 in response to an unlocking operation being performed on the interior door lock knob H3 or an unlocking operation requested by the remote control key or the like, the displacement of the I/S lock lever 35 is transmitted to the linearly moving lock lever 40 via the concave recess 40B and the operating part 35B. As a result thereof, the linearly moving lock lever 40 is pulled down from the position shown in FIG. 10 to the position shown in FIG. 5.

When the O/S lock lever 30 pivots counterclockwise in response to the locking operation being performed on the key cylinder H2, the displacement of the O/S lock lever 30 is transmitted to the linearly moving lock lever 40 via the engaging concave segment 30D and the engaging convex part 40C. As a result thereof, the linearly moving lock lever 40 is lifted (pulled up) from the position shown in FIG. 5 to the position shown in FIG. 10.

When the O/S lock lever 30 pivots clockwise in response to the unlocking operation being performed on the key cylinder H2, the displacement of the O/S lock lever 30 is transmitted to the linearly moving lock lever 40 via the engaging concave segment 30D and the engaging convex part 40C. As a result thereof, the linearly moving lock lever 40 is pushed down from the position shown in FIG. 10 to the position shown in FIG. 5.

As shown in FIGS. 9 and 11-14, a first surface 44A, a second surface 44B, and a third surface 44C are formed on the linearly moving lock lever 40 between the elongated hole 40H and the concave recess 40B. The first surface 44A, the second surface 44B, and the third surface 44C are formed on the surface of the linearly moving lock lever 40 that faces the vehicle exterior. The first surface 44A and the third surface 44C are each flat surfaces that extend in the up-down direction. The first surface 44A is displaced (shifted) more towards the vehicle interior than the third surface 44C. The second surface 44B is an inclined surface that connects the lower end of the first surface 44A with the upper end of the third surface 44C.

As shown in FIGS. 5, 6, and 11-14, a projection 29A projects forward from the front surface of the inertial lever 29. The projection 29A comes into slide-contact with the first surface 44A, the second surface 44B, and the third surface 44C in response to the linear movement of the linearly moving lock lever 40.

As shown in FIGS. 3 and 11-14, an inertial lever guide surface 90G is formed on the third housing 90 on the side of the housing chamber 7A. The inertial lever guide surface 90G is a downward flat surface located farther towards the vehicle exterior than the contacted portion 12B of the pawl 12. The inertial lever guide surface 90G extends toward the vehicle exterior so as to separate (be spaced) from the contacted portion 12B. As shown in FIG. 11, when the O/S open lever 20 has not yet been pivoted, the inertial lever guide surface 90G is located between the lower end of the contacted portion 12B and the upper end of the inertial lever 29 in the up-down direction.

The position of the linearly moving lock lever 40 shown in FIGS. 11 and 12 is the same as the position of the linearly moving lock lever 40 shown in FIG. 5. The position of the linearly moving lock lever 40 shown in FIGS. 13 and 14 is the same as the position of the linearly moving lock lever 40 shown in FIG. 10.

When the linearly moving lock lever 40 is located at the position shown in FIGS. 11 and 12, the projection 29A of the inertial lever 29 comes into contact with the first surface 44A of the linearly moving lock lever 40, whereby the inertial lever 29 is retained in an upward position. In the state shown in FIG. 12, if the inertial lever 29 rises, the inertial lever 29 comes into contact with the contacted portion 12B and causes the pawl 12 to open the fork 11 so that the striker S1 can be released.

Figure 13:
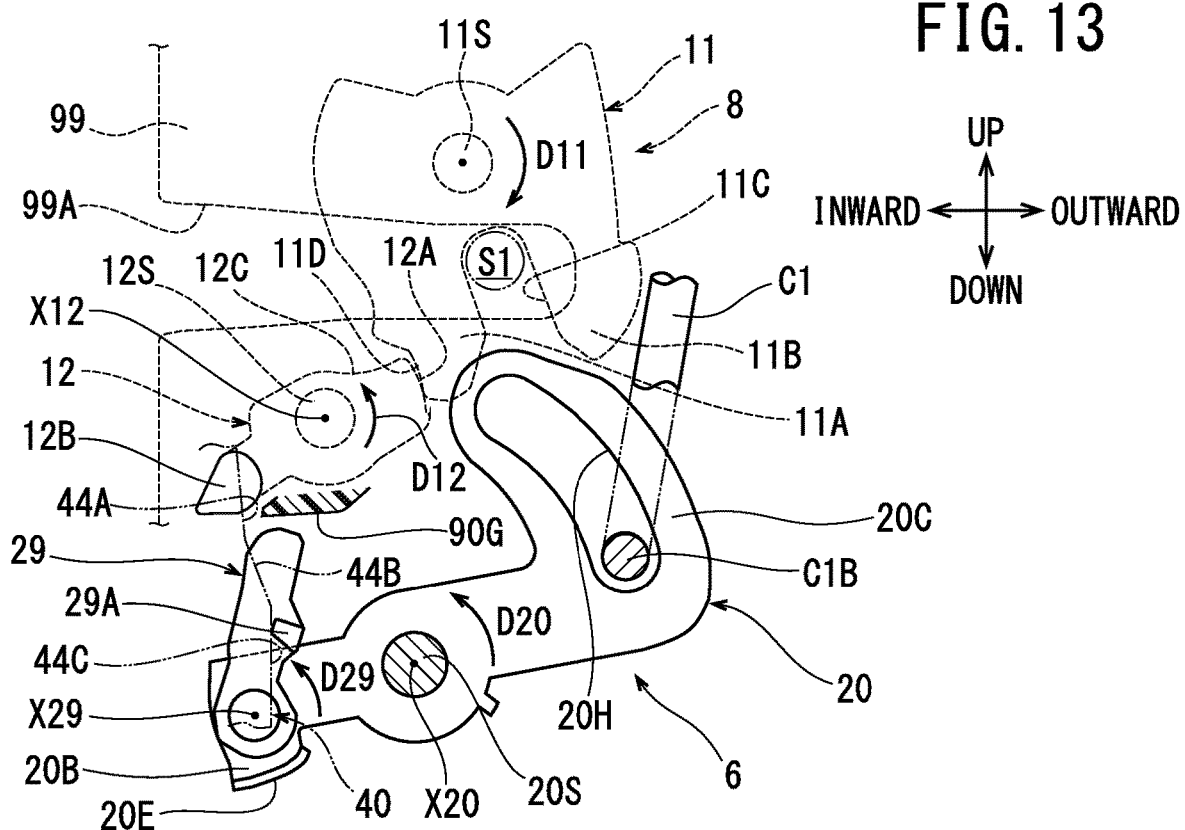
FIG. 13 is a third schematic view for explaining the operations of the O/S open lever, the inertial lever, the fork, and the pawl.
Figure 14:
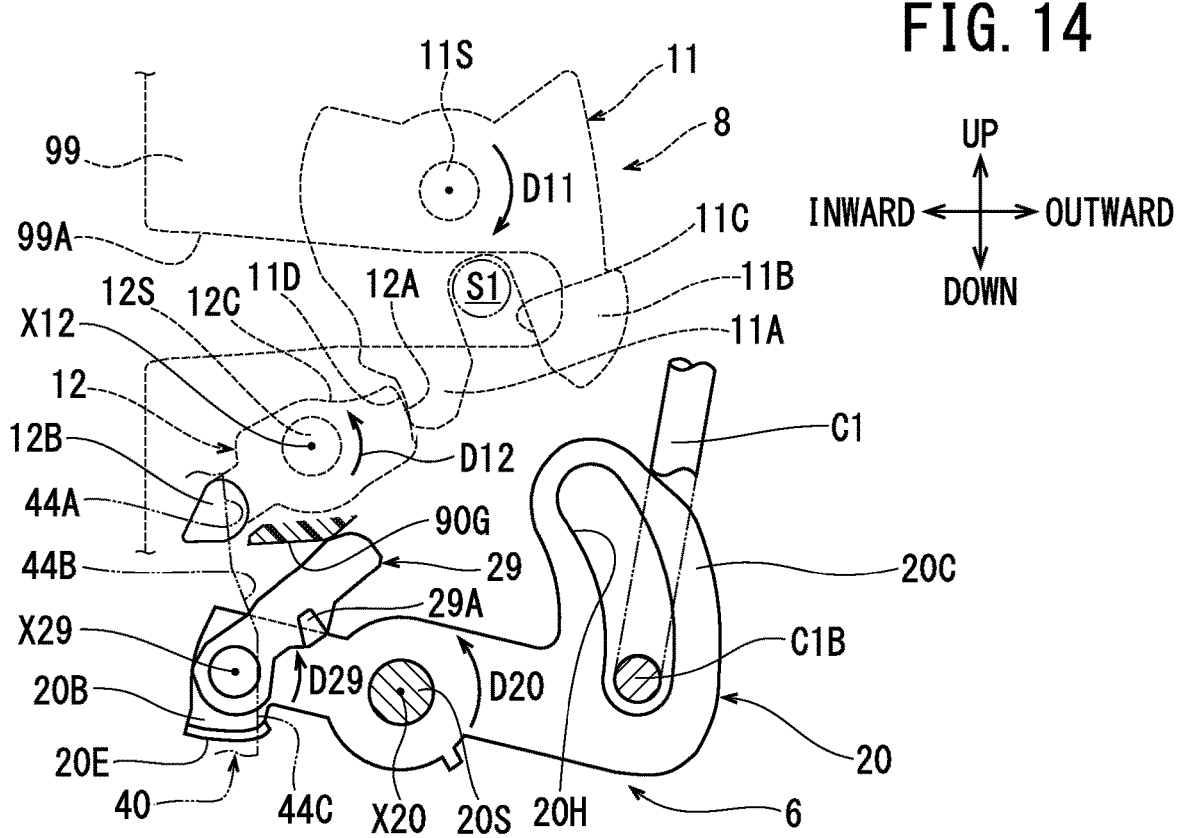
FIG. 14 is a fourth schematic view for explaining the operations of the O/S open lever, the inertial lever, the fork, and the pawl.

When the linearly moving lock lever 40 is displaced to the position shown in FIGS. 10, 13, and 14, the projection 29A of the inertial lever 29 comes into slide-contact with the second surface 44B of the linearly moving lock lever 40 and then comes into contact with the third surface 44C, whereby the inertial lever 29 is held inclined toward the vehicle exterior. In the state shown in FIG. 14, if the inertial lever 29 rises, the inertial lever 29 comes into contact with the inertial lever guide surface 90G, the inertial lever 29 separates from the contacted portion 12B, and the pawl 12 continues to fix (retain) the fork 11.

The position of the inertial lever 29 shown in FIGS. 11 and 12 is an unlock position where the inertial lever 29 is capable of acting on the pawl 12. The position of the inertial lever 29 shown in FIGS. 13 and 14 is a lock position where the inertial lever 29 is incapable of acting on the pawl 12. In the position shown in FIGS. 10, 13, and 14, the third surface 44C comes into contact with the projection 29A and the linearly moving lock lever 40 retains the inertial lever 29 in the lock position. The position of the linearly moving lock lever 40 shown in FIGS. 10, 13, and 14 is a locked position.

In the position shown in FIGS. 5, 11, and 12, the third surface 44C separates (is spaced) from the projection 29 and the linearly moving lock lever 40 does not hold the inertial lever 29 in the lock position shown in FIGS. 13 and 14. The inertial lever 29 brings the projection 29A into contact with the first surface 44A due to the urging force of the torsion coil spring 29T. When an impact (shock or impulse) acts on the inertial lever 29, the inertial lever 29 causes the projection 29A to separate from the first surface 44A and is displaced to the lock position. The position of the linearly moving lock lever 40 shown in FIGS. 5, 11, and 12 is an unlocked position.

In the unlocked position shown in FIGS. 5, 11, and 12, the linearly moving lock lever 40 causes the inertial lever 29 to stand upright and enables the fork 11 located in the latch position shown in FIG. 11 to be displaced to the unlatch position shown in FIG. 12. In the locked position shown in FIGS. 10, 13, and 14, the linearly moving lock lever 40 inclines the inertial lever 29 and disables the fork 11 located in the latch position shown in FIG. 11 from being displaced to the unlatch position shown in FIG. 12.

The above-described representative door lock apparatus 1, which has such a configuration, can hold the door closed with respect to the vehicle frame, open the door, and lock or unlock the door in the closed state in response to different types of operations performed by an occupant of the vehicle.

Operation and Effects

In the door lock apparatus 1 of the above-described embodiment, the plane P2 of rotation, which contains the arcuate trajectory traced by the linkage 20C of the O/S open lever 20 when the linkage 20C pivots in response to the opening operation being performed on the exterior door handle H1, is located farther in the frontward direction of the vehicle frame than the fixing surface P1. Furthermore, the plane P2 of rotation extends at an angle relative to a plane containing the fixing surface P1 such that the plane P2 of rotation intersects the plane of the fixing surface P1 in a downward direction of the vehicle frame, e.g., as shown in FIGS. 16 and 17.

Therefore, even if the door lock apparatus 1 is mounted on the door with the fixing surface P1 of the base plate 99 inclined with respect to the vertical direction due to the shape of the door on which the vehicle door lock apparatus 1 is mounted, it is possible to reduce the inclination of the plane P2 of rotation, which contains the trajectory of the linkage 20C, relative to the plane P3, which contains the arcuate trajectory traced by the upper end C1A of the transmission rod C1 when the upper end C1A pivots in response to the opening operation being performed on the exterior door handle H1.

More specifically, in an embodiment in which the door lock apparatus 1 is mounted on the front door A1, e.g., as shown in FIG. 16, the plane P2 of rotation, which contains the trajectory (movement path) of the linkage 20C, extends in a substantially vertical direction and is at least substantially parallel to the plane P3, which contains the trajectory (movement path) of the upper end C1A of the transmission rod C1. In another embodiment in which the door lock apparatus 1 is instead mounted on the rear door A2, e.g., as shown in FIG. 17, the plane P2 of rotation, which contains the trajectory (movement path) of the linkage 20C, is slightly inclined relative to the vertical direction. Therefore, the inclination relative to the plane P3, which contains the trajectory (movement path) of the upper end C1A of the transmission rod C1, decreases.

In particular, in the door lock apparatus 1 of the above-described embodiment, since the inclination angle α1 of the plane P2 of rotation with respect to the plane of the fixing surface P1 is 5° or more and 15° or less, it is possible to reliably reduce the angle of inclination of the plane P2 of rotation with respect to the plane P3 even when the door lock apparatus 1 is mounted on doors having differing shapes.

As a result, in the door lock apparatus 1 of the above-described embodiment, the transmission rod C1 is less likely to be distorted when the opening operation is being performed on the exterior door handle H1. Consequently, it is possible to inhibit or prevent a deterioration in operation sensitivity, a loss of transmission stroke, etc.

Therefore, with the door lock apparatus 1 of the above-described embodiment, it is possible to satisfactorily transmit the opening operation from the exterior door handle H1 to the O/S open lever 20 via the transmission rod C1. Consequently, it is possible to open any door, such as the front door A1, the rear door A2, etc., in a satisfactory manner.

In addition, the door lock apparatus 1 of the present teachings may be mounted on a variety of types of door shapes, e.g., as shown in FIGS. 16 and 17, by preparing a plurality of transmission rods having a plurality of different bent shapes, as the transmission rod C1, as long as the lower end C1B extends in a direction that is at least substantially orthogonal to the plane P2 of rotation and the lower end C1B is inserted into the elongated hole 20H of the linkage 20C.

In this way, because the lower end C1B of the transmission rod C1 is coupled to the linkage 20C in a direction that is at least substantially orthogonal to the plane P2 of rotation, the transmission of the opening operation from the lower end C1B of the transmission rod C1 to the linkage 20C of the O/S open lever 20 can be performed in a more ideal manner.

Furthermore, the door lock apparatus 1 of the present teachings may include the movement guide 70G formed in the first base wall 71 of the first housing 70, e.g., as shown in FIGS. 1 and 7. In such an embodiment, the movement guide 70G surrounds a portion of the O/S open lever 20 that is adjacent to the linkage 20C in a direction that is at least substantially orthogonal to the plane P2 of rotation, e.g., in the direction of the second axis X20. By utilizing the movement guide 70G, it is possible to inhibit or reduce rattling during the pivoting movement of the O/S open lever 20. During assembly, the O/S open lever 20 can be provisionally fixed by inserting a portion of the O/S open lever 20 that is adjacent to the linkage 20C into the movement guide 70G. Therefore, it is possible to easily assembly (mount) the third housing 90 onto the first housing 70 and to easily assembly (mount) the second housing 80 onto the first housing 70.

In addition, the door lock apparatus 1 of the present teachings may include the inertial lever 29 that is supported by the O/S open lever 20 so as to be pivotable about the first axis X29, which is at least substantially parallel to the pawl axis X12, e.g., as shown in FIGS. 5 and 15. In such an embodiment, when the inertial lever 29 rises and acts on (pushes) the pawl 12 as indicated by the alternating long dash and two short dashes line in FIG. 15, it is possible to reduce or minimize the influence of the inclination of the second axis X20 on the pawl axis X12, i.e. the influence of the inclination of the plane P2 of rotation with respect to the fixing surface P1. Even if the inertial lever 29 pivots about the first axis X29 at the position indicated by the alternating long dash and two short dashes line in FIG. 15, the upper end surface of the inertial lever 29 is maintained in the state in which it is at least substantially parallel to the lower end surface of the pawl 12. Therefore, the inertial lever 29 makes it possible for the pawl 12 to release the fork 11 more satisfactorily.

Although the present invention has been described above in line with a detailed embodiment, it is needless to say that the invention is not limited to the above-described detailed embodiment, and it may be appropriately modified in application without departing from the gist of the invention.

For example, in the above-described first embodiment, the inertial lever 29, which is a representative, non-limiting example of a first lever, is pivotably supported by the O/S open lever, which is a representative, non-limiting example of a second lever. However, the present invention is not limited to this configuration. For example, a transmission lever or the like may be interposed between the first lever and the second lever. A specific example of such a modified embodiment is explained below. Instead of the elongated hole 20H according to the above-described first embodiment, a round hole may penetrate through the linkage of the second lever. In this case, the lower end of the transmission rod is coupled to the round hole. Consequently, the second lever will always pivot when the opening operation is being performed on the exterior door handle. Furthermore, the transmission lever may be pivotably supported independently from the second lever. In this case, when the second lever pivots in response to the opening operation being performed on the exterior door handle, the second lever comes into contact with the transmission lever and causes the transmission lever to pivot and displace (move) the first lever. Thus, when the opening operation is being performed on the interior door handle, the transmission lever pivots independently from the second lever and displaces the first lever. Such a configuration is also included within the scope of the present teachings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved vehicle door lock apparatuses and methods for manufacturing and operating the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A vehicle door lock apparatus configured to be coupled to a transmission rod having an upper end portion that extends at least substantially vertically and is coupled to an exterior door handle, comprising:

a housing including a base plate fixed in a state in which a fixing surface abuts against a door that is openable and closable with respect to a vehicle frame, to which a striker is fixed, the base plate also having an entry opening, into which the striker can enter, formed therein;

a fork pivotably provided on the base plate and that is displaceable to a latched position, where the fork retains the striker in the entry opening, and to an unlatched position, where the fork allows the striker to separate from the entry opening;

a pawl pivotably provided on the base plate, the pawl being configured to move so as to fix or release the fork;

a first lever displaceably provided in the housing, the first lever being configured to act on the pawl when it is displaced about a first axis and cause the pawl to release the fork; and a second lever pivotably provided in the housing so as to be pivotable about a second axis, the second lever having a linkage formed at a first end of the second lever and being configured to be coupled to a lower end of the transmission rod, the second lever being configured to act on the first lever and displace the first lever when the second lever pivots in response to an opening operation being performed on the exterior door handle that causes the transmission rod to move downwardly, wherein:
the second axis is inclined at an angle to a plane containing the fixing surface such that a plane of rotation of the second lever, which contains an arcuate trajectory traced by the linkage when it pivots in response to the opening operation being performed, is located farther in a frontward direction of the vehicle frame than the fixing surface, and
the plane of rotation extends at an angle relative to the plane containing the fixing surface such that the plane of rotation intersects the plane of the fixing surface in a downward direction of the vehicle frame.

2. The vehicle door lock apparatus according to claim 1, wherein the plane of rotation is inclined with respect to the plane of the fixing surface by 5° or more and 15° or less.

3. The vehicle door lock apparatus according to claim 2, wherein:
the lower end of the transmission rod is coupled to the linkage in a direction that is at least substantially orthogonal to the plane of rotation,
the pawl is supported by the base plate so as to be pivotable about a pawl axis that is at least substantially orthogonal to the plane containing the fixing surface, and
the first lever is supported by the second lever so as to be pivotable about the first axis that is at least substantially parallel to the pawl axis.

4. The vehicle door lock apparatus according to claim 1, wherein the lower end of the transmission rod is configured to be coupled to the linkage in a direction that is at least substantially orthogonal to the plane of rotation.

5. The vehicle door lock apparatus according to claim 1, wherein a movement guide is formed in the housing as a slit shape that is contained within, or is at least substantially in parallel to, the plane of rotation, the movement guide surrounding a portion of the second lever that is adjacent to the linkage and being configured to guide pivoting movement of the second lever about an axis that is at least substantially orthogonal to the plane of rotation.

6. The vehicle door lock apparatus according to claim 1, wherein:
the pawl is supported by the base plate so as to be pivotable about a pawl axis that is at least substantially orthogonal to the plane containing the fixing surface, and
the first lever is supported by the second lever so as to be pivotable about the first axis that is at least substantially parallel to the pawl axis.

7. The vehicle door lock apparatus according to claim 1, wherein the pawl is pivotable about a pawl axis and the second lever is pivotally supported on a pivot shaft that is inclined with respect to the pawl axis and with respect to the fixing surface.

8. A vehicle comprising:
a vehicle frame;
a striker affixed to the vehicle frame;
a vehicle door that is openable and closable with respect to the vehicle frame, the vehicle door having an inclined surface that is inclined at an angle to a vertical direction of the vehicle;
an exterior door handle movably disposed on the vehicle door and having a dimension that extends in a horizontal direction of the vehicle, the vertical direction being perpendicular to the horizontal direction;
a housing including a base plate having a fixing surface defined thereon and an entry opening configured to receive the striker, the fixing surface being affixed to the inclined surface of the vehicle door;
a fork pivotably provided on the base plate such that the fork is displaceable from a latched position, where the fork retains the striker in the entry opening, to an unlatched position, where the fork allows the striker to separate from the entry opening, and vice versa;
a pawl pivotably provided on the base plate, the pawl being configured to move so as to fix or release the fork;
a first lever displaceably provided in the housing, the first lever being configured to act on the pawl when the first lever is displaced about a first axis and cause the pawl to release the fork;
a second lever provided in the housing so as to be pivotable about a second axis, the second lever having a linkage formed at a first end of the second lever; and
a transmission rod operably connecting the linkage to the exterior door handle;
wherein:
an upper portion of the transmission rod extends at least substantially in the vertical direction,
the second lever is configured to act on the first lever and displace the first lever when the second lever is pivoted about the second axis by the transmission rod in response to an opening operation being performed on the exterior door handle that causes the transmission rod to move downwardly in the vertical direction,
the second axis is inclined at an angle to a plane containing the fixing surface such that a plane of rotation of the second lever contains an arcuate trajectory traced by the linkage when it pivots in response to the opening operation being performed,
the plane of rotation is located farther in a frontward direction of the vehicle frame than the fixing surface, and
the plane of rotation extends at an angle relative to the plane containing the fixing surface such that the plane of rotation intersects the plane of the fixing surface in a downward direction of the vehicle frame.

9. The vehicle according to claim 8, wherein:
the plane of rotation is inclined relative to the plane of the fixing surface by an angle of 5°-15°,
the first lever is pivotably attached to a second end of the second lever at the first axis, the second end being opposite of the first end of the second lever,
the pawl is pivotable about a pawl axis, and
the first axis extends in parallel to the pawl axis.

10. The vehicle according to claim 9, further comprising:
a slit-shaped movement guide defined in the housing such that the plane of rotation intersects, or is at least substantially in parallel to, the slit-shaped movement guide,
wherein the slit-shaped movement guide surrounds a portion of the second lever that is adjacent to the linkage and is configured to guide pivoting movement of the second lever about the second axis that is at least substantially orthogonal to the plane of rotation.

11. The vehicle according to claim 10, wherein:
the lower end of the transmission rod is coupled to the linkage such that the lower end extends at least substantially orthogonal to the plane of rotation, the pawl is supported by the base plate so as to be pivotable about a pawl axis that is at least substantially orthogonal to the plane containing the fixing surface, and the first lever is supported by the second lever so as to be pivotable about the first axis that is at least substantially parallel to the pawl axis.

12. The vehicle according to claim 8, wherein:

at least one bend is formed in the transmission rod between the upper portion of the transmission rod and the lower end of the transmission rod, and the lower end of the transmission rod is coupled to the linkage such that the lower end extends at least substantially orthogonal to the plane of rotation.

13. The vehicle according to claim 8, further comprising:

a slit-shaped movement guide defined in the housing such that the plane of rotation intersects, or is at least substantially in parallel to, the slit-shaped movement guide, wherein the slit-shaped movement guide surrounds a portion of the second lever that is adjacent to the linkage and is configured to guide pivoting movement of the second lever about the second axis that is at least substantially orthogonal to the plane of rotation.

14. The vehicle according to claim 8, wherein:

the pawl is supported by the base plate so as to be pivotable about a pawl axis that is at least substantially orthogonal to the plane containing the fixing surface, and the first lever is supported by the second lever so as to be pivotable about the first axis that is at least substantially parallel to the pawl axis.

15. The vehicle door lock apparatus according to claim 8, wherein the vehicle door is a driver-side vehicle door or a passenger-side vehicle door.

16. An apparatus comprising:

a housing including a base plate having a fixing surface defined thereon and an entry opening configured to receive a striker affixed to a vehicle frame, the fixing surface being configured to be fixedly abutted against a vehicle door;

a fork pivotably provided on the base plate such that the fork is displaceable from a latched position, where the fork is configured to retain the striker in the entry opening, to an unlatched position, where the fork is configured to allow the striker to separate from the entry opening, and vice versa;

a pawl pivotably provided on the base plate, the pawl being configured to pivot relative to the base plate about a pawl axis so as to fix or release the fork;

a first lever provided in the housing so as to be displaceable relative to the housing, the first lever being configured to act on the pawl when the first lever is displaced to cause the pawl to release the fork; and a second lever provided in the housing, the second lever having a linkage formed at a first end of the second lever and the first lever being pivotably attached to a second end of the second lever such that the first lever is pivotable relative to the second lever about a first axis, the second lever being pivotable relative to the housing about a second axis to displace the first lever when the second lever pivots in response to an opening operation being performed on the exterior door handle, wherein:

the linkage is configured to be coupled to a lower end of a transmission rod that is operably coupled to an exterior door handle and has an upper portion that extends at least substantially vertically;

the first end of the second lever is inclined relative to the second end of the second lever at an angle;

a first plane of rotation contains a first arcuate trajectory traced by the linkage when the linkage pivots about the second axis in response to the opening operation being performed, a second plane of rotation contains a second arcuate trajectory traced by the first lever when the second lever pivots about the second axis in response to the opening operation being performed, the first plane of rotation differing from the second plane of rotation, the apparatus is configured to be mounted on the vehicle door such that the first plane of rotation is located farther in a frontward direction of the vehicle frame than the fixing surface, and the first plane of rotation extends at an angle relative to a plane containing the fixing surface such that the plane of rotation intersects the plane of the fixing surface in a downward direction of the vehicle frame.

17. The apparatus according to claim 16, wherein:

the first plane of rotation is inclined relative to the plane of the fixing surface by an angle of 5°-15°, and the pawl axis extends in parallel to the first axis.

18. The apparatus according to claim 16, further comprising:

a slit-shaped movement guide defined in the housing such that the first plane of rotation intersects, or is at least substantially in parallel to, the slit-shaped movement guide, wherein the slit-shaped movement guide surrounds a portion of the second lever that is adjacent to the linkage and is configured to guide pivoting movement of the second lever about the second axis that is at least substantially orthogonal to the first plane of rotation.

19. The apparatus according to claim 16, wherein:

the pawl is supported by the base plate such that the pawl axis is at least substantially orthogonal to the plane containing the fixing surface, and the first lever is supported by the second lever so as to be pivotable about the first axis that is at least substantially parallel to the pawl axis.

20. The apparatus according to claim 16, further comprising:

a slit-shaped movement guide defined in the housing such that the first plane of rotation intersects, or is at least substantially in parallel to, the slit-shaped movement guide, wherein the slit-shaped movement guide surrounds a portion of the second lever that is adjacent to the linkage and is configured to guide pivoting movement of the second lever about the second axis that is at least substantially orthogonal to the first plane of rotation, the linkage is configured to be coupled to the lower end of the transmission rod such that the lower end of the transmission rod extends at least substantially orthogonal to the first plane of rotation, the pawl is supported by the base plate such that the pawl axis is at least substantially orthogonal to the plane containing the fixing surface, and the first lever is supported by the second lever so as to be pivotable about the first axis that is at least substantially parallel to the pawl axis.

* * * * *